US012355127B2

(12) United States Patent
Berge et al.

(10) Patent No.: US 12,355,127 B2
(45) Date of Patent: Jul. 8, 2025

(54) FIELD-ADJUSTABLE FLEX CIRCUIT TRANSMISSION LINE FILTERS

(71) Applicant: International Business Machines Corporation, Armonk, NY (US)

(72) Inventors: Layne A. Berge, Rochester, MN (US); Matthew Doyle, Chatfield, MN (US); Kyle Schoneck, Rochester, MN (US); Thomas W. Liang, Rochester, MN (US); John R. Dangler, Rochester, MN (US); Matthew A. Walther, Rochester, MN (US); Jason J. Bjorgaard, Rochester, MN (US); Trevor Timpane, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 288 days.

(21) Appl. No.: 18/060,746

(22) Filed: Dec. 1, 2022

(65) Prior Publication Data

US 2024/0186671 A1 Jun. 6, 2024

(51) Int. Cl.
*H01P 1/20* (2006.01)
*H01P 3/06* (2006.01)
*H01P 11/00* (2006.01)

(52) U.S. Cl.
CPC .................. *H01P 1/20* (2013.01); *H01P 3/06* (2013.01); *H01P 11/005* (2013.01)

(58) Field of Classification Search
CPC ........ H03H 7/004; H03H 7/468; H03H 3/007; H03H 1/00; H03H 11/02;
(Continued)

(56) References Cited

U.S. PATENT DOCUMENTS 5,781,078 A 7/1998 Jones
6,606,014 B2 8/2003 Miller
(Continued)

FOREIGN PATENT DOCUMENTS

WO 2016073293 A2 5/2016

OTHER PUBLICATIONS

Elawamry, et al., "Investigation to Metamaterial Transmission Line Filters Based on the CL-Loaded Approach," Conference: Piers 2012 Kula Lumpur Program, Mar. 1, 2012, Progress in Electromagnetics Research Symposium.

*Primary Examiner* — Lincoln D Donovan
*Assistant Examiner* — Tyler J Pereny
(74) *Attorney, Agent, or Firm* — Amin, Turocy & Watson, LLP

(57) ABSTRACT

One or more devices and/or methods provided herein relate to a method for fabricating a filtering electronic device having a co-integrated impedance modification element and signal transmission line. An electronic structure can comprise a signal transmission line, and an impedance modification element adjacent to and external to the signal transmission line, wherein the impedance modification element comprises a structure having differentiated sections, along the signal transmission line, that provide corresponding differentiated impedances. In an embodiment, the impedance modification element can comprise a plurality of impedance sub-elements spaced apart from one another along and adjacent to the signal transmission line to facilitate the different impedances.

15 Claims, 10 Drawing Sheets

(58) Field of Classification Search

CPC . H03H 2001/0021; H01P 3/08; H01P 1/2039; H01P 5/028; H01P 1/20; H01P 1/201; H01P 1/2013; H01P 1/20345; H01P 1/20363; H01P 11/008; H01P 3/003; H01P 3/085; H01P 3/088; H01P 5/12; H01P 5/187; H01P 7/00; H05K 1/0243; H05K 1/025; H05K 2201/09672; H05K 2201/09727; H05K 1/0219; H05K 1/0228; H05K 1/0233; H05K 1/0236; H05K 1/024; H05K 1/0245; H05K 1/09

See application file for complete search history.

(56) References Cited

U.S. PATENT DOCUMENTS

| | | | | |
|---|---|---|---|---|
| 7,500,874 | B2 | 3/2009 | Montena | |
| 9,118,516 | B1 | 8/2015 | Ao et al. | |
| 9,570,784 | B2 | 2/2017 | Baba et al. | |
| 9,654,060 | B1 * | 5/2017 | Choi | H03F 7/02 |
| 9,947,979 | B2 | 4/2018 | Baba et al. | |
| 11,284,513 | B2 | 3/2022 | Yoo et al. | |
| 11,456,514 | B2 * | 9/2022 | Junttila | H01P 3/08 |
| 2019/0348733 | A1 * | 11/2019 | Wilkerson, Jr. | H01P 1/202 |

* cited by examiner

FIELD-ADJUSTABLE FLEX CIRCUIT TRANSMISSION LINE FILTERS

FIELD OF THE INVENTION

The present disclosure relates generally to transmission line filters, and more specifically to a transmission line filter that can be field-adjustable.

BACKGROUND

In quantum computing systems, radar applications and/or other signal-based applications, filtering devices, such as transmission line filters, can be employed to modify a frequency response of a device being filtered. Such filtering devices can provide a static (e.g., single and non-dynamic) frequency response modification.

SUMMARY

The following presents a summary to provide a basic understanding of one or more embodiments described herein. This summary is not intended to identify key or critical elements, and/or to delineate scope of embodiments or scope of claims. Its sole purpose is to present concepts in a simplified form as a prelude to the more detailed description that is presented later. In one or more embodiments described herein, systems, methods and/or apparatuses can facilitate a process to filter a transmission line to adjust a frequency response of the transmission line, wherein the adjustment can be field-adjustable and/or provide for differentiated impedances along a transmission line.

In accordance with one or more embodiments, an electronic structure can comprise a signal transmission line, and an impedance modification element adjacent to and external to the signal transmission line, wherein the impedance modification element comprises a structure having differentiated sections, along the signal transmission line, that provide corresponding differentiated impedances.

An advantage of the aforementioned electronic structure can be an ability to provide varied impedances, and thus a varied, or even oscillating, frequency response along a transmission line. Such shifting of a frequency response can be desired depending on the usage mode of the transmission line, such as for a low-temperature quantum computing-based application.

Another advantage of the aforementioned electronic structure can be integration of a filtering element (e.g., impedance modification element) with a transmission line, thus lower component count, lowering overall manufacturing cost and/or increasing component density (e.g., saving space and/or real estate).

In one or more embodiments, the impedance modification element can comprise a plurality of impedance sub-elements spaced apart from one another along and adjacent to the signal transmission line to facilitate the different impedances.

An advantage of this feature can be discrete placement of such impedance sub-elements and spacings, which can allow for discrete single-time and/or adjustable control of a varied frequency response to a signal being transmitted along the transmission line.

In accordance with another embodiment, a method for fabricating an electronic structure by a fabrication system can comprise coupling, by the fabrication system, an impedance modification element adjacent and external to a signal transmission line, wherein the impedance modification element comprises a structure having differentiated sections, along the signal transmission line, that provide corresponding differentiated impedances.

An advantage of the aforementioned method can be fabrication of an electronic structure having an ability to provide varied impedances, and thus a varied, or even oscillating, frequency response along a transmission line. Such shifting of a frequency response can be desired depending on the usage mode of the transmission line, such as for a low-temperature quantum computing-based application.

Another advantage of the aforementioned method can be integration of a filtering element (e.g., impedance modification element) with a transmission line, thus lower component count, lowering overall manufacturing cost and/or increasing component density (e.g., saving space and/or real estate). In one or more embodiments, the impedance modification element can comprise a plurality of impedance sub-elements spaced apart from one another along and adjacent to the signal transmission line to facilitate the different impedances.

In one or more embodiments, the method can further comprise spacing, by the fabrication system, a plurality of impedance sub-elements of the impedance modification element apart from one another and adjacent to the signal transmission line to facilitate the different impedances.

An advantage of this feature can be discrete placement of such impedance sub-elements and spacings, which can allow for discrete single-time and/or adjustable control of a varied frequency response to a signal being transmitted along the transmission line.

In accordance with still another embodiment, an electronic structure can comprise a signal transmission line, and an impedance modification element adjacent the signal transmission line, the impedance modification element comprising a plurality of impedance sub-elements spaced apart from one another, along the signal transmission line, that provide corresponding differentiated impedances, and an outer shield adjacent the impedance sub-elements and spaced farther from the signal transmission line than the impedance sub-elements.

An advantage of the aforementioned electronic structure can be an ability to provide varied impedances, and thus a varied, or even oscillating, frequency response along a transmission line. Such shifting of a frequency response can be desired depending on the usage mode of the transmission line, such as for a low-temperature quantum computing-based application. Another advantage of the electronic structure can be discrete placement of such impedance sub-elements and spacings, which can allow for discrete single-time and/or adjustable control of a varied frequency response to a signal being transmitted along the transmission line.

Still another advantage of the electronic structure can be shielding, by an outer shield, of the sub-elements from external temperatures and/or noise that can affect the varied frequency response.

Another advantage of the aforementioned electronic structure can be integration of a filtering element (e.g., impedance modification element) with a transmission line, thus lowering component count, lowering overall manufacturing cost and/or increasing component density (e.g., saving space and/or real estate). In one or more embodiments, the impedance modification element can comprise a plurality of impedance sub-elements spaced apart from one another along and adjacent to the signal transmission line to facilitate the different impedances.

In one or more embodiments, the impedance sub-elements and outer shield can be adjustably coupled relative to one another or can be adjustably coupled relative to the signal transmission line.

An advantage of this feature can be allowance for field-adjusting of filtering to adjust filtering relative to a usage of the electronic structure, such as due to different quantum executions with respect to use at a quantum system.

DETAILED DESCRIPTION

Figure 1:
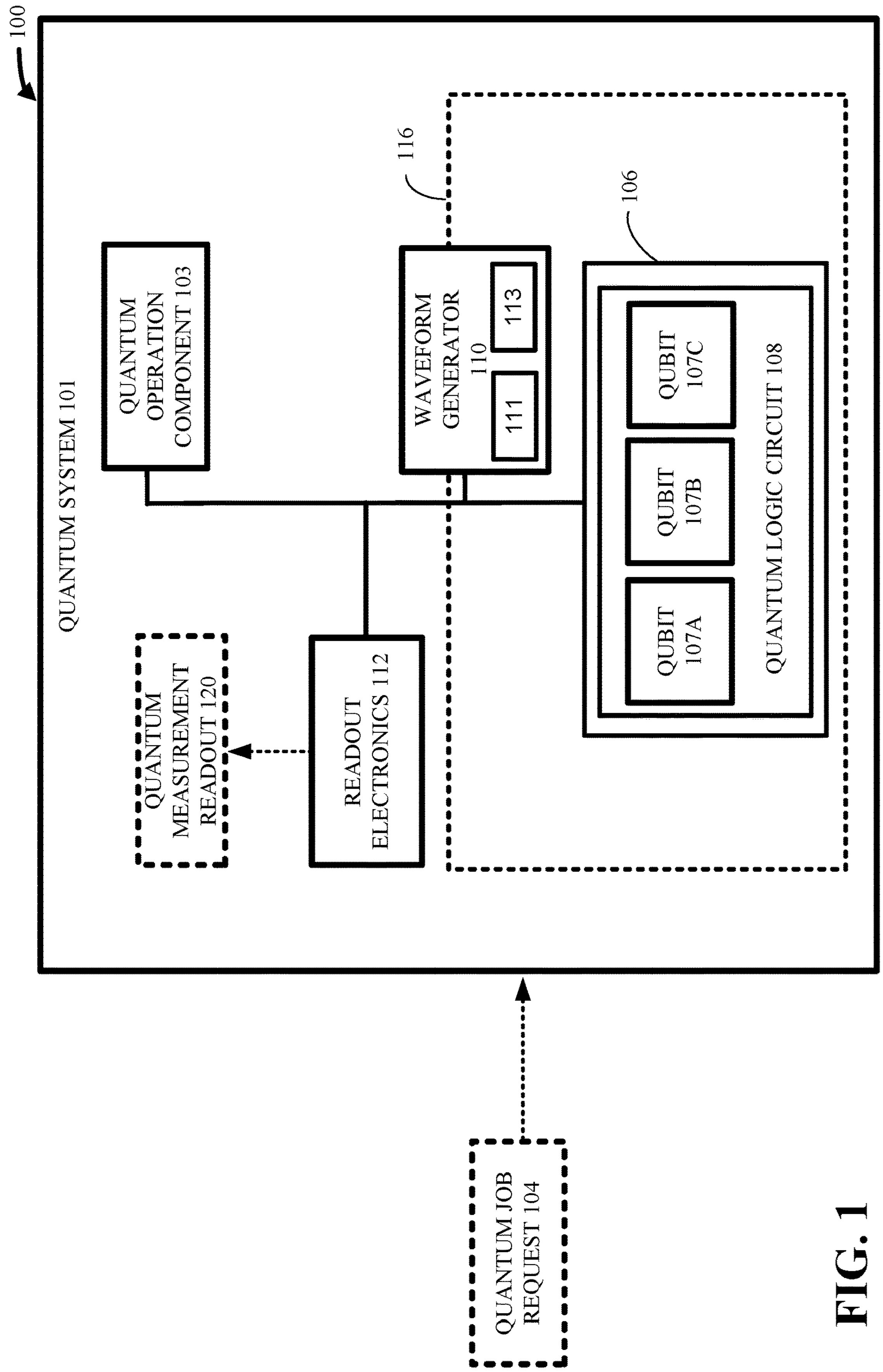
FIG. 1 illustrates a block diagram of an example, non-limiting system that can facilitate measurement readout from one or more qubits, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section or in the Detailed Description section. One or more embodiments are now described with reference to the drawings, wherein like reference numerals are utilized to refer to like elements throughout. In the following description, for purposes of explanation, numerous details are set forth in order to provide a more thorough understanding of the one or more embodiments. However, in various cases, the one or more embodiments can be practiced without these details.

Discussion is provided herein relative to an electronic structure comprising a filtering element for use in a quantum system, such as for use within a cryogenic unit and/or in a room temperature environment external to the cryogenic unit. The electronic structure can have varying uses for connecting elements, components and/or circuit boards and allowing transmission of one or more signals within and/or external to a cryogenic unit of a quantum system. However, one or more electronic structures described and discussed herein can be employed for other uses, such as for radio, radar and/or other signal-based applications. Description and discussion herein is therefore not limited to use in a quantum system or in the quantum space only.

Turning first to existing frameworks for filtering signals transmitted along a transmission line, a filter element can be applied to modify an impedance at a discrete location along a transmission line, such as to modify an output of the transmission line. In one or more embodiments, filtering can be applied to adjust for system noise, filter signal noise and/or adjust for a temperature and/or other environmental change along the transmission line. However, these disturbances (e.g., system noise, filter signal noise and/or environmental change) need to be known such that a static filter can be applied at an appropriate location along a transmission line. Where such disturbances can be dynamic, such as changing in realtime during use of the transmission line (e.g., during transmission of a signal along the transmission line), the static filters cannot provide adequate filtering and/or signal transmission can fail and/or otherwise be negatively affected. Indeed, conventional filtering frameworks do not allow for shifting of a frequency response by filtering, such as depending upon a dynamically changing usage mode.

Further issues can include manufacturing a filter at a transmission line, and/or as an aggregated electronic structure (e.g., comprising a filter and transmission line), yet still allowing such filter to be field-adjustable. For example, conventional filtering method can comprise clipping notch filters around a signal transmission line, such as a coaxial cable. This can increase part cost, allow for integration failure (e.g., a notch filter is broken or falls of) and/or can be manually applied (e.g., allowing for varying differences in application to a signal transmission line, and thus reducing consistency of the filtering). Indeed, conventional discrete filtering consumes space, adds cost and does not provide adequate filtering at low temperatures, such as milli-Kelvin (mK) temperatures.

To account for one or more deficiencies of existing frameworks for filtering signals along a transmission line, fabrication of a filtering electronic structure and/or use of a transmission line, one or more embodiments described herein can provide integrated filter and signal transmission line electronic structures, which can comprise flexible circuits and/or cabling. Such one or more embodiments can be constructed to function at low temperatures, such as mK temperatures. Such one or more embodiments can allow for adjusted impedance at specific intervals along a signal transmission line and/or for post-manufacturing filtering adjustments.

Generally, an electronic structure described herein can comprise a co-integrated signal transmission line and an impedance modification element. The impedance modification element can be generally disposed adjacent to and external to the signal transmission line. Moreover, the impedance modification element can comprise a structure having differentiated sections, along the signal transmission line, that can provide corresponding differentiated impedances. In one or more embodiments, the impedances can be adjustable by adjusting the impedance modification element. The adjustment can comprise rotating, threading, screwing and/or otherwise moving at least a portion (e.g., an impedance sub-element) of an impedance modification element.

In one or more embodiments, an impedance modification element can comprise a plurality of impedance sub-elements that are spaced apart from one another along the signal transmission line. In one or more embodiments at least one of the impedance sub-elements and/or an outer shield disposed about the one or more impedance sub-elements, can be adjustably coupled relative to one another and/or relative to the signal transmission line, to allow for the aforementioned impedance field-adjustment.

As will be described below, an impedance modification element can comprise one or more varied spacing between impedance sub-elements, varied types of sub-elements, varied dimensions of sub-elements, varied spacing between impedance sub-elements and a respective signal transmission line and/or varied materials and/or material combinations. Impedance sub-elements (and thus the impedance modification elements comprising the impedance sub-elements) can comprise one or more traces, metal members, vias, dielectric materials, conductive rings, shielding members and/or crossbars. One or more impedance modification elements can be arranged next to and/or surrounding at least a portion of a respective signal transmission line.

As used herein, the terms "on" and "above" can be used in a context, as is customary, to indicate orientation or relative position in a vertical or orthogonal direction to the surface of the substrate, for example in a vertical z-direction.

As used herein, the term "lateral" and/or "laterally" can be used, as is customary, to indicate orientation generally parallel to the plane of the substrate, as opposed to generally vertically or outwardly, from the substrate surface.

As used herein, the term "vertical" and/or "vertically" can be used, as is customary, to indicate orientation generally orthogonal (e.g., vertical z-direction) to the plane of the substrate, and thus also in a direction outward from the plane of the substrate, as opposed to generally laterally along the substrate surface.

As used herein, the term "arranged on/at" can be understood in a broad sense and shall include embodiments according to which an intermediate layer, such as an insulating layer, can be arranged between a substrate/ground plane/ground and a respectively described layer/structure. Hence the terms "arranged on" and/or "arranged at" can comprise the meaning of "arranged above".

As used herein, the terms "entity", "requesting entity" and "user entity" can refer to a machine, device, component, hardware, software, smart device and/or human.

One or more embodiments are now described with reference to the drawings, where like referenced numerals are used to refer to like elements throughout. In the following description, for purposes of explanation, numerous details are set forth in order to provide a more thorough understanding of the one or more embodiments. However, in various cases, the one or more embodiments can be practiced without these details.

Generally, the subject computer processing system, methods, apparatuses, devices and/or computer program products can be employed to solve new problems that can arise through advancements in technology, computer networks and/or the Internet.

Further, the one or more embodiments depicted in one or more figures described herein are for illustration only, and as such, the architecture of embodiments is not limited to the systems, devices and/or components depicted therein, nor to any particular order, connection and/or coupling of systems, devices and/or components depicted therein.

Turning first generally to FIG. 1, one or more embodiments described herein can include one or more devices, systems and/or apparatuses that can facilitate executing one or more operations to facilitate generation of one or more qubit drive, excitation and/or readout pulses (e.g., signals, waveforms and/or wavelets). FIG. 1 illustrates a block diagram of an example, non-limiting system 100 that can facilitate operation of a quantum circuit such as by employing an electronic structure 113 according to the present disclosure. The electronic structure 113 can be employed at the readout electronics, control electronics (e.g., quantum operation component 103) waveform generator 110 and/or connecting any components and/or elements of the quantum system 101, within and/or external to the cryogenic environment 116.

The following/aforementioned description refer to the operation of a single quantum program from a single quantum job request. This operation can include one or more readouts from cryogenic environment electronics within cryogenic chamber 116 by room temperature control/readout electronics 112 external to the cryogenic chamber 116. That is, one or more of the processes described herein can be scalable, also such as including additionally, and/or alternatively, execution of one or more quantum programs and/or quantum job requests in parallel with one another. Scalability of efficient readout can be enabled by employing electronic structures 113 in quantity.

In one or more embodiments, the non-limiting system 100 can be a hybrid system and thus can include both one or more classical systems, such as a quantum program implementation system, and one or more quantum systems, such as the quantum system 101. In one or more other embodiments, the quantum system 101 can be separate from, but function at least partially in parallel with, a classical system.

In such case, one or more communications between one or more components of the non-limiting system 100 and a classical system can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

In one or more other embodiments, the classical system can provide a quantum job request 104, qubit mapping and/or quantum circuit to be executed. Such classical system can analyze the one or more quantum measurement readouts 120. Further, such classical system can manage a queueing of quantum circuits to be operated on the one or more qubits of the quantum logic circuit of a respective quantum system 101.

Figure 10:
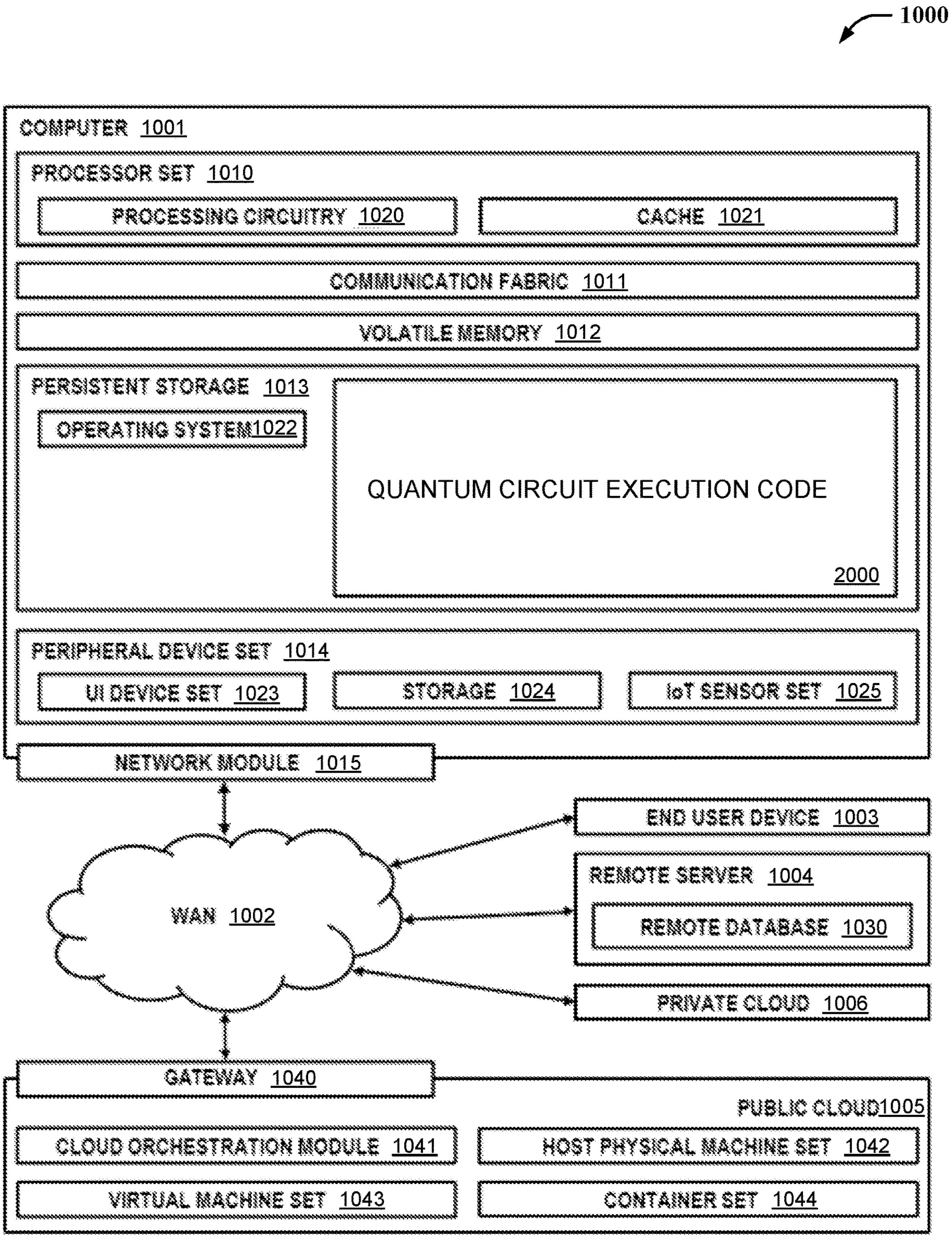
FIG. 10 illustrates a block diagram of example, non-limiting, computer environment in accordance with one or more embodiments described herein.

For example, in one or more embodiments, the non-limiting systems described herein, such as non-limiting system 100 as illustrated at FIG. 1, and/or systems thereof, can further comprise, be associated with and/or be coupled to one or more computer and/or computing-based elements described herein with reference to an operating environment, such as the operating environment 1000 illustrated at FIG. 10. In one or more described embodiments, computer and/or computing-based elements can be used in connection with implementing one or more of the systems, devices, components and/or computer-implemented operations shown and/or described in connection with FIG. 1 and/or with other figures described herein.

The quantum system 101 (e.g., quantum computer system and/or superconducting quantum computer system) can employ quantum algorithms and/or quantum circuitry, including computing components and/or devices, to perform quantum operations and/or functions on input data to produce results that can be output to an entity. The quantum circuitry can comprise quantum bits (qubits), such as multi-bit qubits, physical circuit level components, high level components and/or functions. The quantum circuitry can comprise physical pulses that can be structured (e.g., arranged and/or designed) to perform desired quantum functions and/or computations on data (e.g., input data and/or intermediate data derived from input data) to produce one or more quantum results as an output. The quantum results, e.g., quantum measurement 120, can be responsive to the quantum job request 104 and associated input data and can be based at least in part on the input data, quantum functions and/or quantum computations.

As used herein, a quantum circuit can be a set of operations, such as gates, performed on a set of real-world physical qubits with the purpose of obtaining one or more qubit measurements. A quantum processor can comprise the one or more real-world physical qubits. Operation of a quantum circuit can be facilitated, such as by a waveform generator, to produce one or more physical pulses and/or other waveforms, signals and/or frequencies to alter one or more states of one or more of the physical qubits. The altered states can be measured, thus allowing for one or more computations to be performed regarding the qubits and/or the respective altered states. The waveform generator can be controlled, such as by a respective control stage.

In one or more embodiments, the quantum system 101 can comprise one or more quantum components, such as a quantum operation component 103, a quantum processor 106, quantum readout/control electronics 112, a waveform generator 110, and/or a quantum logic circuit 108 comprising one or more qubits (e.g., qubits 107A, 107B and/or 107C), also referred to herein as qubit devices 107A. 107B and 107C.

The quantum processor 106 can be any suitable processor. The quantum processor 106 can generate one or more instructions for controlling the one or more processes of the quantum logic circuit 108 and/or waveform generator 110.

The quantum operation component 103 can obtain (e.g., download, receive and/or search for) a quantum job request 104 requesting execution of one or more quantum programs. The quantum operation component 103 can determine one or more quantum logic circuits, such as the quantum logic circuit 108, for executing the quantum program. The request 104 can be provided in any suitable format, such as a text format, binary format and/or another suitable format. In one or more embodiments, the request 104 can be received by a component other than a component of the quantum system 101, such as a by a component of a classical system coupled to and/or in communication with the quantum system 101.

The waveform generator 110 can perform one or more waveform for operating and/or affecting one or more quantum circuits on the one or more qubits 107A, 107B and/or 107C. For example, the waveform generator 110 can operate one or more qubit effectors, such as qubit oscillators, harmonic oscillators and/or pulse generators to cause one or more pulses to stimulate and/or manipulate the state of the one or more qubits 107A. 107B and/or 107C comprised by the quantum system 101.

Employing the electronic structure 113, a signal transmitted along a signal transmission line of the electronic structure 113, and/or separate from the electronic structure 113), can be modified, such as by the integrated impedance modification element of the electronic structure 113, resulting in an altered signal output of the electronic structure 113. As noted above, the electronic structure 113 can be constructed for use in a cryogenic environment, such as the cryogenic chamber 116, such as a temperatures in the mK's.

The waveform generator 110, such as at least partially in parallel with the quantum processor 106, can execute operation of a quantum logic circuit on one or more qubits of the circuit (e.g., qubit 107A, 107B and/or 107C). In response, the quantum operation component 103 can output one or more quantum job results, such as one or more quantum measurements 120, in response to the quantum job request 104.

The quantum logic circuit 108 and a portion or all of the waveform generator 110 and/or quantum processor 106 can be contained in a cryogenic environment, such as generated by a cryogenic chamber 116, such as provided by a cryostat. Indeed, a signal can be generated by the waveform generator 110 to affect the one or more qubits 107A-C. Where qubits 107A, 107B and 107C are superconducting qubits, cryogenic temperatures, such as about 4K or lower can be employed to facilitate function of these physical qubits. Accordingly, the elements of the waveform generator 110 also are to be constructed to perform at such cryogenic temperatures.

Turning now to FIGS. 2*a* to 8, illustrated are enlarged views of varying embodiments of electronic structures formed during stages of fabrication methods according to embodiments of the present disclosure. Such electronic structures can be employed as electronic structure 113, as described above relative to a quantum system 101, and/or can be employed as an electronic structure (e.g., a filtering electronic structure) for other suitable purposes, such as signal-based purposes or signal-generating purposes.

Figure 2A:
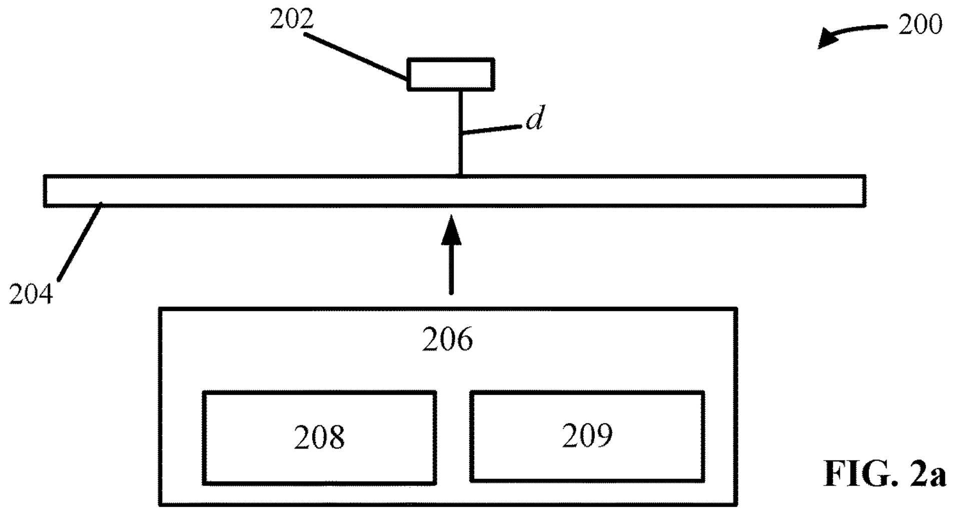
FIG. 2*a* illustrates a basic electronic structure, in accordance with one or more embodiments described herein.

Referring first to FIG. 2*a*, illustrated is a basic electronic structure 200 comprising a co-integrated signal transmission line 202 and an impedance modification element 204. By adjusting distance d between the signal transmission line 202 and the impedance modification element 204, capacitive C can be increased or decreased, thereby changing an impedance Z at a discrete location along the signal transmission line 202. This in turn can cause filtering of the signal transmission line 202, and more particularly of a signal being transmitted along the transmission line 202. Impedance Z can be adjusted relative to a basic Equation 1: Z=SQRT(L/C), where L is inductance (e.g., inductive reactance) of the impedance modification element 204.

This Equation 1 and general concept can be applied to each of the electronic structure embodiments to be described herein, below. Indeed, in view of varying types of impedance modification elements (e.g., varying materials, sizes, shapes, spacings, etc.), varying impedances can be provided at different discrete and/or adjustable locations along the signal transmission line. One or more of these varying impedances can be adjustable, such as in the field, such as prior to and/or during use of the electronic structure (e.g., where a use can comprise a signal being transmitted along the respective signal transmission line).

Referring now generally to the electronic structures of any of the embodiments of FIGS. 2*a*-8, an electronic structure can comprise a co-integrated signal transmission line and an impedance modification element adjacent to and external to the signal transmission line. One or more elements can be disposed between the impedance modification element and the signal transmission line. The impedance modification element can be spaced from the signal transmission line, such as by a distance d to adjust the impedance Z at a location along the signal transmission line of the impedance modification element.

The impedance modification element can comprise a plurality of impedance sub-elements spaced apart form one another along and adjacent to the signal transmission line to facilitate the different impedances. Equal and/or varying spacing can be applied between adjacent ones of the impedance sub-elements. Periodic and/or repeating spacing and/or impedance sub-elements can be employed to cause periodic and/or repeated filtering impedances.

Different impedance sub-elements can have different spacing between an outer periphery of the signal transmission line and the respective impedance sub-elements. For example, a first spacing between an outer periphery of a signal transmission line and a first impedance sub-element of an impedance modification element can be greater than a second spacing between the outer periphery of the signal transmission line and a second impedance sub-element of the impedance modification element.

Different impedance sub-elements can have different dimensions. For example, a first impedance sub-element can have a first length along the signal transmission line that is greater than a second length of a second impedance sub-element along the signal transmission line. The first impedance sub-element and the second impedance sub-element can be disposed adjacent to but spaced apart from one another along the signal transmission line.

An impedance sub-element and/or an impedance modification element can comprise a conductive element, conductive ring, nutsert, threaded portion, length-adjustable portion, sliding portion, crossbar and/or insulating portion.

An impedance modification element can comprise a dielectric unit, such as a dielectric ring, that can be disposed adjacent the signal transmission line and/or between adjacent ones of the impedance sub-elements.

An impedance modification element can comprise a shield, such as an outer shield, which can be comprised of metal, to contain an effect of the impedance and/or to limit disturbance of an impedance by external noise, signals and/or environmental conditions. Such outer shield can be disposed at least partially over at least one impedance sub-element and a portion of the signal transmission line. The outer shield can be spaced from the impedance sub-element and spaced further from the signal transmission line that the impedance sub-element.

A signal transmission line can comprise a cable, such as a coaxial cable or flex cable, a signal trace, an exposed signal transmission line and/or an encapsulated signal transmission line.

Generally, one or more signal transmission lines can be comprised by an electronic structure embodiment described herein. The signal transmission lines can be spaced from and/or fixed to a substrate. Where a signal transmission line is fixed to a substrate, an impedance modification element can be spaced from the substrate and signal transmission line. Where a signal transmission line is spaced from a substrate, an impedance modification element can instead be fixed to the substrate and or also spaced from a supporting substrate.

Each electronic structure embodiment described below is described as comprising a co-integrated signal transmission line. However, any electronic structure embodiment described herein can omit a signal transmission line and instead be assembled onto a signal transmission line for use.

Likewise, one or more of the figures described herein can generally illustrate the signal transmission line as being spaced from a substrate and/or impedance modification element. Any suitable method can be employed to provide this spacing, including, but not limited to a dielectric insert, potting, spacer, non-conductive support and/or thermal and/or electrical insulator.

It is appreciated that each electronic structure embodiment described below can comprise different aspects relative to one or more other embodiments, but that one or more teachings described relative to any one electronic structure embodiment can be applied to any one or more other electronic structure embodiments.

Any one or more electronic structure embodiments described herein can comprise an impedance modification element comprising a dielectric material, metal material and/or other electric or thermal insulator material. Where a metal material is used, such as copper, metallurgy can be defined appropriately to avoid and/or allow only minimal movement during temperature cool-down, such as to mK temperatures.

The figures referenced provide but partial illustrations of electronic structures. Thus, in use, an electronic structure described can be scalable to include additional or fewer impedance modification elements, the co-integrated signal transmission line can be longer, and/or the impedance modification element and/or the signal transmission line can have a different shape (e.g., width, thickness and/or diameter). Where the electronic structure is illustrated as comprising or being comprised by a coaxial cable or similar cable, the concepts described relative to the electronic structure can be applied to a flexible cable, such as comprising a substrate, circuit board and/or printed trace, or vice versa.

Furthermore, any two or more of the embodiments described herein can be used at least partially in parallel with one another. For example, an impedance modification element 224 of FIG. 2*b* can be employed at a same signal transmission line as an impedance modification element 304 of FIG. 3.

Turning again to FIG. 2*a*, but being applicable to any of FIGS. 2*a*-8, in one or more embodiments, one or more operations for fabricating the one or more electronic devices described herein, such as the electronic structure 200, can be performed by a manufacturing system, such as a manufacturing system 206 (also herein referred to as fabrication system 206) comprising one or more manufacturing devices 208, where the manufacturing system 206 is operatively coupled to a processor 209 for at least partially controlling the one or more operations. The processor 209 can be any suitable processor. Discussion proved below with respect to processor 1010 can be at least partially equally applicable to the processor 209.

In one or more embodiments, the manufacturing system 206 can be configured, such as by one or more operations performed by one or more of the manufacturing devices 208 in view of one or more instructions provided by the processor 209, to construct the electronic structure 200, such as relative to and/or on a substrate. The manufacturing devices 209 can, perform, among other operations, one or more deposition, transfer, etching, cutting, placement, removal, radiation, irradiation, adhesive and/or metallization operations.

Figure 2B:
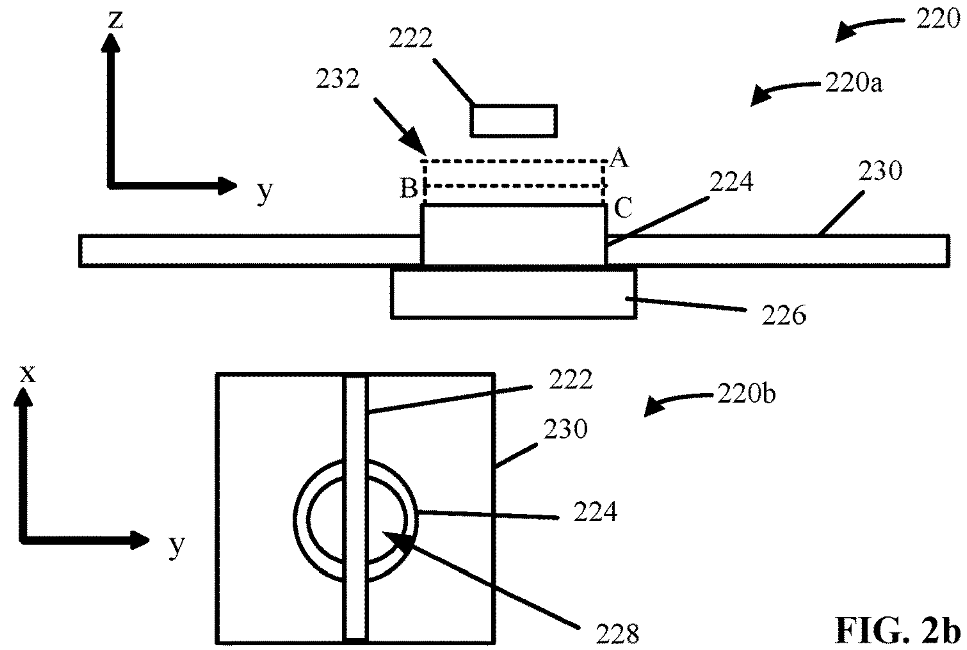
FIG. 2*b* illustrates two views of another electronic structure, in accordance with one or more embodiments described herein.
Figure 2C:
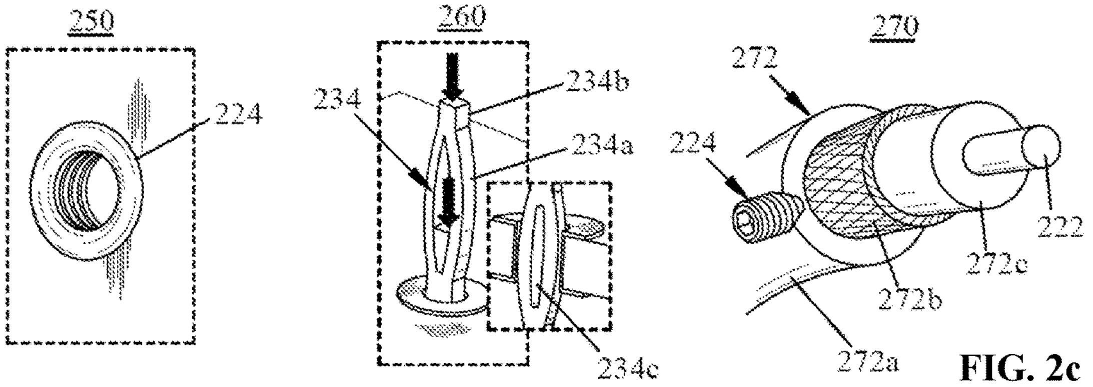
FIG. 2*c* illustrates three views of additional electronic structures, in accordance with one or more embodiments described herein.

Turning next to FIG. 2*b* (comprising views 220*a* and 220*b*) and FIG. 2*c* (comprising illustration portions 250, 260 and 270), an electronic structure 220 can be employed to provide field-adjustable impedance to a signal line. The electronic structure 220 can comprise a substrate 230, a signal transmission line 222, and an impedance modification element 224.

As illustrated, the signal transmission line 222 can be spaced from the impedance modification element.

The impedance modification element 224 can be assembled into an opening 228 or other hole in the substrate 230. The substrate 230, and/or any other substrate of any other embodiment discussed herein, can comprise a dielectric, such as glass-reinforced epoxy laminate (e.g., NEMA grade FR4 or Megtron4). The impedance modification element 224 can be coupled to the substrate by tensive, physical, chemical and/or adhesive means.

The impedance modification element 224 can comprise any suitable material, such as metal As shown at illustration portion 250 (FIG. 2*c*), the impedance modification element 224 can be a nutsert, such as made of a metal material (e.g., steel). The metal can be a conductive metal. As used herein, a nutsert can be a ring-shaped element.

As shown at illustration portion 260 (FIG. 2*c*), in another embodiment, the impedance modification element 224 can comprise a plug 234, such as a force plug. An outer periphery of the plug 234 can have larger outer diameter section 234*a* disposed adjacent a lesser outer diameter section 234*b*, or intermediately disposed between a pair of lesser outer diameter sections 234*b*, the less outer diameter sections 234*b* being of same or different diameters. The plug 234 can be at least partially compressible due to an inner void 234*c*. The plug 234 also can comprise metal material.

In still other embodiments, the impedance modification element 224 can be plated at the opening or hole 228, such as by a plated through hole (PTH) fabrication procedure, such as by the fabrication system 206.

The impedance modification element 224 can have threads and be screwed or pressed into the substrate 230. The impedance modification element 224 can omit threads and be pressed and/or adhered into the substrate 230. That is, the impedance modification element 224 can be coupled to the substrate by tensive, physical, chemical and/or adhesive means. In an embodiment, the impedance modification element 224, and thus the electronic structure 220, can comprise a secondary impedance sub-element 226, which can be a nut-like element, into which the impedance modification element 224 can be coupled, such as by physical, chemical, tensive and/or adhesive means.

Each of the impedance modification element 224 and the impedance sub-element 226 can comprise threads. Threads can be formed using a photo-imageable process, such as by fabrication system 206.

One of the impedance modification element 224 or the impedance sub-element 226 can comprise a channel and the other of the impedance modification element 224 or the impedance sub-element 226 can comprise a key, such that the impedance modification element 224 and the impedance sub-element 226 can be coupled together similar to a two-piece rivet assembly.

As shown at illustration portion 270 (FIG. 2*c*), although the impedance modification element 224 is illustrated as implemented with a substrate 230, such as a flexible substrate, the impedance modification element 224 instead could be coupled at a cable, such as at an outer periphery of a cylindrical cable, such as a coaxial cable 272. From external to internal, the coaxial cable 272 can have a plurality of layers such as an outer sheath 272*a*, inner support 272*b*, insulation 272*c* and signal transmission line 222. The impedance modification element 224 can be coupled to any one or more of these plurality of layers.

In one or more embodiments, the impedance modification element 224 can be adjustably coupled relative to the signal transmission line 222. That is, as shown at FIG. 2*b*, the impedance modification element 224 can be adjusted to any of locations A, B or C relative to the signal transmission line 222. This adjustment alone can vary the impedance Z. The adjustment can be made by a user entity, such as by force, by rotation and/or using corresponding threads.

An advantage of the aforementioned electronic structures of FIGS. 2*b* and 2*c* can be an ability to provide varied impedances (where scaling the impedance modification elements 224, 234), and thus a varied, or even oscillating, frequency response along a transmission line. Such shifting of a frequency response can be desired depending on the usage mode of the transmission line, such as for a low-temperature quantum computing-based application. Another advantage of the electronic structures can be discrete placement of such impedance sub-elements and spacings, which can allow for discrete single-time and/or adjustable control of a varied frequency response to a signal being transmitted along the transmission line. Indeed, an advantage of the electronic structures can be field-adjustable positioning of the impedance modification elements 224, 234 relative to the signal transmission lines, thus facilitating field-adjustable impedances of the electronic structures.

Figure 3:
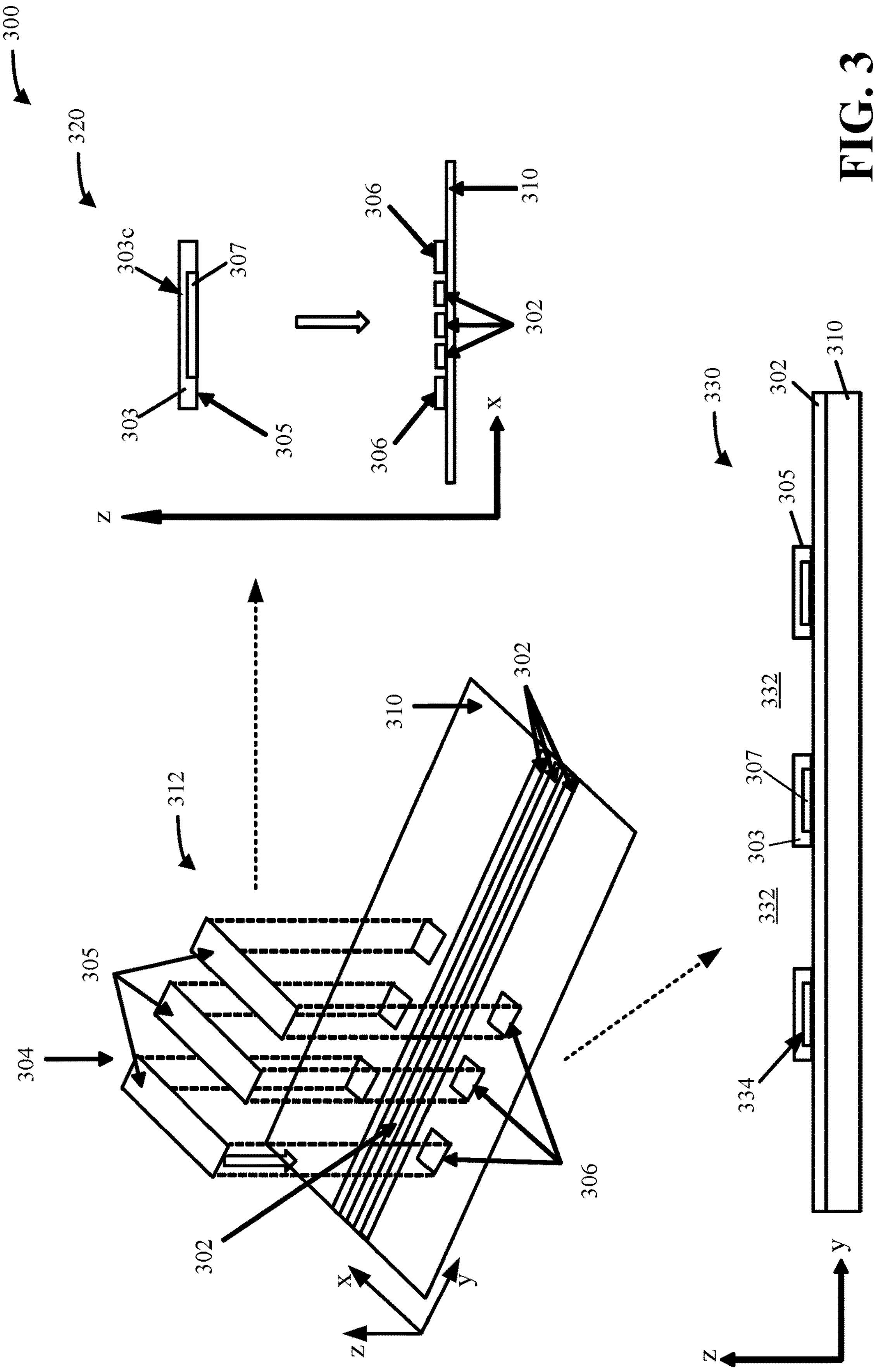
FIG. 3 illustrates an orthogonal view of yet another electronic structure, in accordance with one or more embodiments described herein.

Referring now to FIG. 3 (comprising views 312, 320 and 330), an electronic structure 300 can comprise a substrate 310, at least one impedance modification element 304, and at least one signal transmission line 302. Repetitive description of like elements and/or processes employed in previously described embodiments is omitted for sake of brevity.

As shown, the signal transmission line 302 can be coupled directly to or nearly adjacent to the substrate 310, such as being a trace formed on or attached to the substrate 310. A plurality of signal transmission lines 302 can be aligned, such as spaced relative to one another. As illustrated, three signal trace signal transmission lines 302 are aligned parallel to one another and collinearly to one another along the substrate 310.

The substrate 310 can be a flexible substrate, thus being able to be at least partially bent or curved to fit around and/or between elements.

As illustrated at FIG. 3, an electronic structure described herein can comprise an impedance modification element (e.g., 304), comprising a plurality of impedance sub-elements (e.g., 305), such as being spaced apart from one another along and adjacent to the signal transmission line to facilitate different impedances along the signal transmission line. In the specific embodiment of FIG. 3, a set of three impedance sub-elements 305 of an impedance modification element 304 are spaced apart from one another along the plurality of signal transmission lines 302. Spacing between the impedance sub-elements 305 is equal spacing, although varied spacings between impedance sub-elements 305 can be employed in one or more other embodiments, such as to differently tune one or more effects of the filtering aspects of the electronic filter.

The T impedance sub-elements 305 can be defined as crossbars.

Looking at the cross-section view 330 of FIG. 3, in this way, default impedance zones 332 can be formed (along the signal transmission lines 302) in the spaces between the impedance sub-elements 305. Lower impedance zones 334 (e.g., having lower impedance $Z_1$ than the impedance $Z_0$ of the default impedance zones 332) can be formed (along the signal transmission lines 302) where the impedance sub-elements 305 overlap the signal transmission lines 302.

As illustrated at the cross-section view 320 of FIG. 3, the impedance sub-elements 305 can comprise both an impedance altering portion 303 and an insulator portion 307. The insulator portion 307 can comprise a dielectric material. The impedance altering portion 303 can comprise a metal, such as copper. The insulator portion 307 can serve as a spacer to allow for a defined distance d between a central section 303*c* of the impedance altering portion 303 and the one or more overlapped signal transmission lines 302.

As illustrated, the impedance modification element 304 can comprise grounding elements 306, grounding the impedance sub-elements 305 relative to the substrate 310 and the signal transmission lines 302. The grounding elements 306 likewise can be used to space the impedance sub-elements 305 from the signal transmission lines 302, with the grounding elements 306 being coupled to the substrate 310 and the impedance sub-elements 305 being coupled to the grounding elements 306. The grounding elements 306 can comprise a conductive material.

The impedance sub-elements 305 can be coupled to the grounding elements 306 by any suitable method, such as magnetically, soldering, screwing, conductive epoxy and/or other physical, adhesive and/or chemical coupling. For example, an adhesive layer can be applied to a lower surface of the impedance altering portion 303 and/or insulator portion 307 that is to contact the grounding elements 306 and/or the signal transmission lines 302.

An advantage of the aforementioned electronic structure 300 of FIG. 3 can be an ability to provide varied impedances, and thus a varied, or even oscillating, frequency response along a transmission line. Such shifting of a frequency response can be desired depending on the usage mode of the transmission line, such as for a low-temperature quantum computing-based application. Another advantage of the electronic structure 300 can be discrete placement of such impedance sub-elements and spacings, which can allow for discrete single-time and/or adjustable control of a varied frequency response to a signal being transmitted along the transmission line. Indeed, an advantage of the electronic structure 300 can be field-adjustable positioning of the impedance modification element 304 relative to the signal transmission lines, thus facilitating field-adjustable impedances of the electronic structure.

Figure 4:
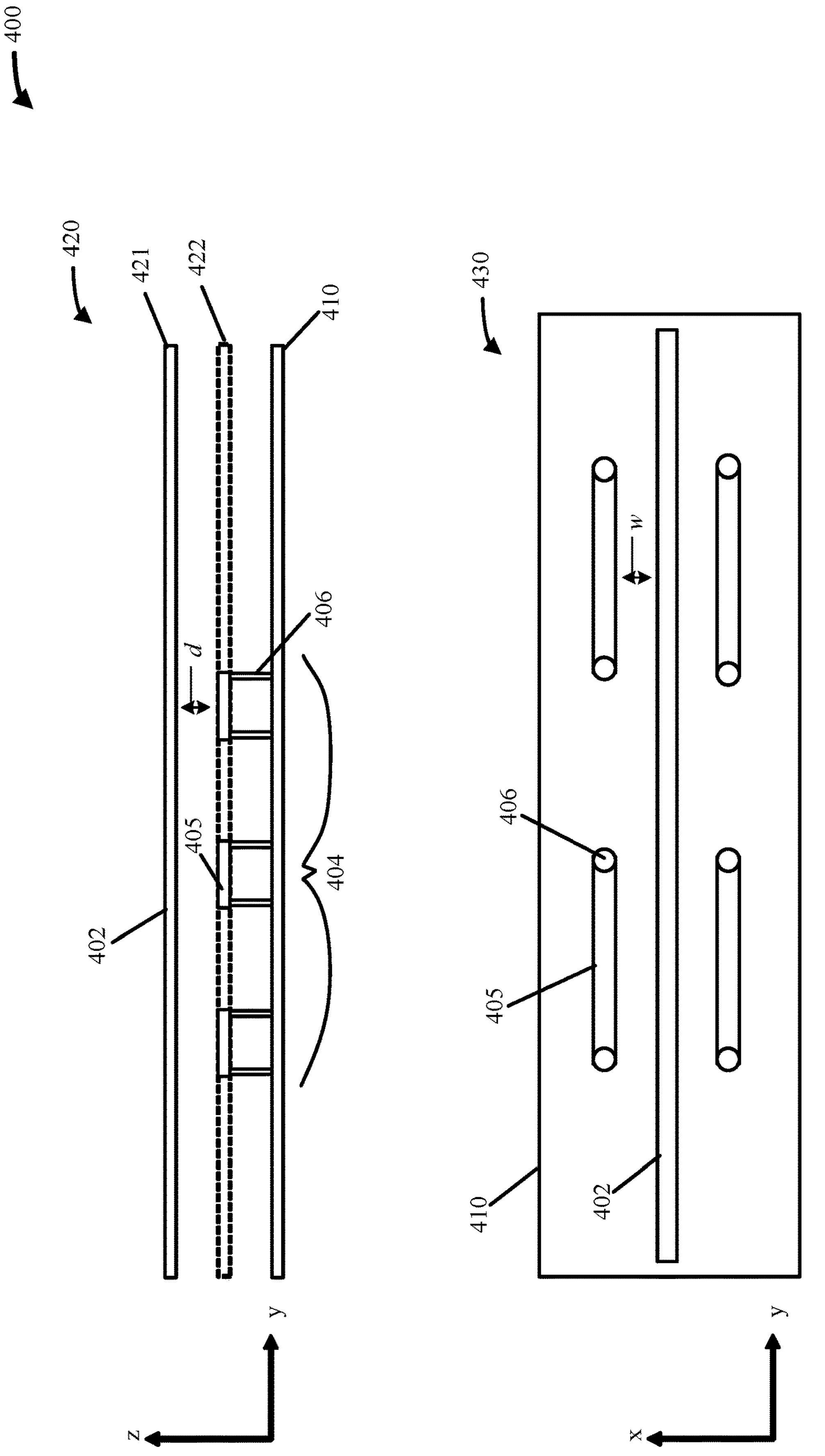
FIG. 4 illustrates two views of another electronic structure, in accordance with one or more embodiments described herein.

At FIG. 4 (comprising views 420 and 430), illustrated is another electronic structure 400 that, similar to the electronic structure 300, comprises a substrate, signal transmission line and impedance modification element having a plurality of impedance sub-elements. Repetitive description of like elements and/or processes employed in previously described embodiments is omitted for sake of brevity.

Differently from the electronic structure 300, the electronic structure 400 comprises the signal transmission line 402 spaced from the substrate 410, with the impedance modification element 404 disposed between the signal transmission line 402 and the substrate 410. (The electronic structure 300 instead comprises the signal transmission lines 302 disposed between the substrate 310 and the impedance modification element 304.)

That is, the electronic structure 400 comprises a plurality of impedance sub-elements 305 spaced apart from one another along the signal transmission line 402. Spacing between the impedance sub-elements 405 is equal spacing, although varied spacings between impedance sub-elements 405 can be employed in one or more other embodiments, such as to different tune one or more effects of the filtering aspects of the electronic filter.

As illustrated, the impedance modification element 404 can comprise grounding elements 406, grounding the impedance sub-elements 405 relative to the substrate 410. The grounding elements 406 likewise can be used to provide a defined d between the impedance sub-elements 405 and the signal transmission line 402, with the grounding elements 406 being coupled to the substrate 410 and the impedance sub-elements 405 being coupled to the grounding elements 406. In one or more embodiments, the grounding elements 406 can comprise ground vias coupled to or through the substrate 410, which can comprise and/or be comprised by a ground layer of the electronic structure 400. The grounding elements 406 can comprise a conductive material.

The impedance sub-elements 405 can be coupled to the grounding elements 406 by any suitable method, such as magnetically, soldering, screwing, conductive epoxy and/or other physical, adhesive and/or chemical coupling. For example, an adhesive layer can be applied to a lower surface of the impedance sub-elements 405 that is to contact the grounding elements 406.

The signal transmission line 402 can be supported relative to and spaced from the impedance modification element 404 by any suitable means, such as, but not limited to, a dielectric insert, potting, spacer, non-conductive support and/or thermal and/or electrical insulator.

As illustrated, in one or more embodiments, the signal transmission line 402, or another signal transmission line, can be positioned generally parallel along the illustrated x-axis to the impedance sub-elements 405 (e.g., in a same or generally same plane as the impedance sub-elements 405). That is, a signal transmission line at position 421 can be associated with impedance Z's defined both by distance d and distance w. Differently, a signal transmission line at position 422 can be associated with impedance Z's defined by distance w, but with distance d being equal to approximately 0 units.

In one or more embodiments, a first spacing between a first impedance sub-element 405 and an outer periphery of the signal transmission line 402 can be greater than a second spacing between the outer periphery of the signal transmission line 402 and a second impedance sub-element 405. In this way, impedances along the signal transmission line 402 can be further differentiated by different signal transmission line and impedance sub-element overlapping sections and signal transmission line and impedance sub-element non-overlapping sections, such as where there can be varied (e.g., different) impedances at different signal transmission line and impedance sub-element overlapping section. That is, both the signal transmission line and impedance sub-element overlapping sections and signal transmission line and impedance sub-element non-overlapping sections can be referred to collectively as differentiated sections of the electronic structure 400, providing differentiated impedances.

An advantage of the aforementioned electronic structure 400 of FIG. 4 can be an ability to provide varied impedances, and thus a varied, or even oscillating, frequency response along a transmission line. Such shifting of a frequency response can be desired depending on the usage mode of the transmission line, such as for a low-temperature quantum computing-based application. Another advantage of the electronic structure 400 can be discrete placement of such impedance sub-elements and spacings, which can allow for discrete single-time and/or adjustable control of a varied frequency response to a signal being transmitted along the transmission line. Indeed, an advantage of the electronic structure 400 can be field-adjustable positioning of the impedance modification element 404 relative to the signal transmission line, thus facilitating field-adjustable impedances of the electronic structure.

Figure 5A:
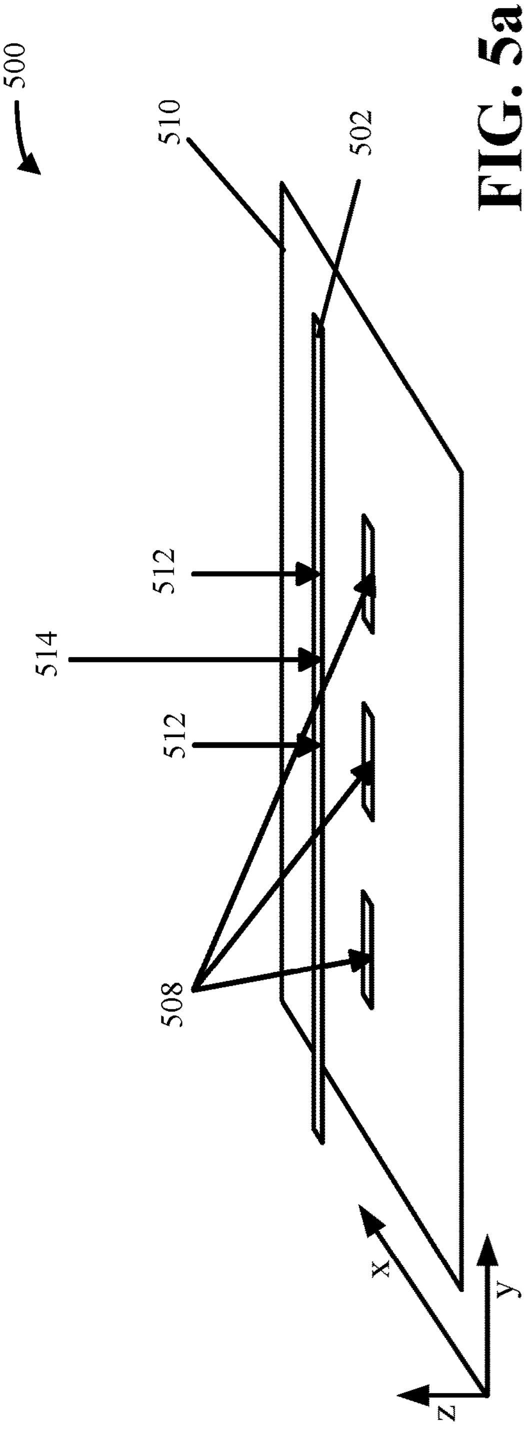
FIG. 5*a* illustrates an orthogonal view of still another electronic structure, in accordance with one or more embodiments described herein.

Turning now to FIG. 5*a*, illustrated is an electronic structure 500 that can comprise a substrate 510 having openings 508. Repetitive description of like elements and/or processes employed in previously described embodiments is omitted for sake of brevity.

The substrate 510 can comprise a material allowing the substrate 510 to serve as an impedance modification element 504 and also as a ground plane. As such, the ground plane of the substrate 510 can be a non-fully continuous ground plane, at least along a section overlapped by the signal transmission line 502.

That is, the impedance modification element 504 can comprise impedance sub-elements 505 provided by the sections disposed adjacent to and between the openings 508. Accordingly, at sections of the electronic structure 500 where the signal transmission line 502 overlaps the sections 505, impedance can be lower than sections of the electronic structure 500 where the signal transmission line 502 overlaps the openings 508.

The signal transmission line 502 can comprise a signal trace and can be disposed at the substrate 510 and/or spaced from the substrate 510 by a distance d.

The substrate 510 can be a flexible substrate, and thus the electronic structure 500 can comprise and/or be comprised by a flexible cable, such as where the electronic structure 500 extends farther than partially illustrated along the illustrated y-axis.

An advantage of the aforementioned electronic structure 500 of FIG. 5*a* can be an ability to provide varied impedances, and thus a varied, or even oscillating, frequency response along a transmission line. Such shifting of a frequency response can be desired depending on the usage mode of the transmission line, such as for a low-temperature quantum computing-based application. Another advantage of the electronic structure 500 can be discrete placement of such impedance sub-elements and spacings, which can allow for discrete single-time and/or adjustable control of a varied frequency response to a signal being transmitted along the transmission line.

Figure 5B:
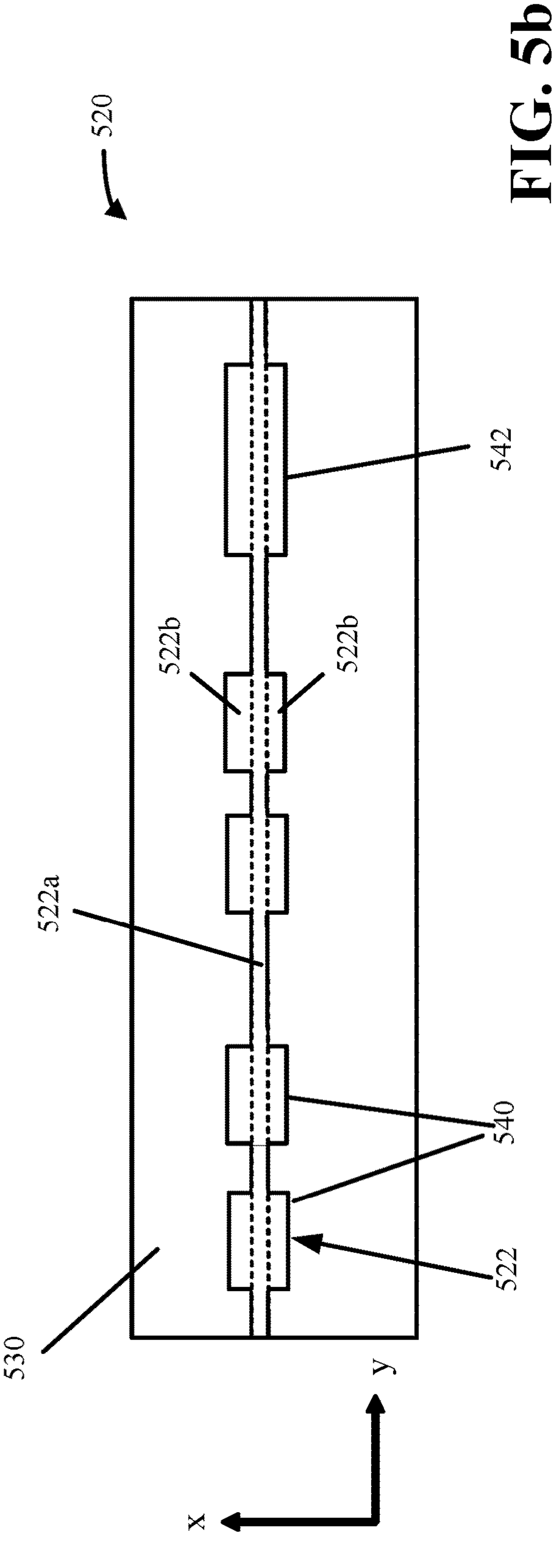
FIG. 5*b* illustrates a top view of yet another electronic structure, in accordance with one or more embodiments described herein.

Next, FIG. 5*b* illustrates an electronic structure 520 that can comprise a substrate 530 and signal trace 522. Repetitive description of like elements and/or processes employed in previously described embodiments is omitted for sake of brevity.

The substrate 530 can comprise any suitable material and can be flexible. That is, the electronic structure 520 can comprise and/or be comprised by a flexible cable, such as where the electronic structure 520 extends farther than partially illustrated along the illustrated y-axis.

The signal trace 522 can be a single signal trace of unitary construction. Alternatively, the signal trace can comprise sections comprised of different materials adjacent one another.

For example, the signal trace 522 can comprise a signal transmission line portion 522*a* extending along the substrate 530. Sections 540, 542 of the signal trace 522, can comprise impedance sub-element sections 522*b* of an overall impedance modification element. The sections 540, 542 can be spaced from one another along the substrate 530 and along a long direction (e.g., along the illustrated y-axis) of the signal transmission line portion 522*a*.

In one or more embodiments, one or more of the impedance sub-element sections 522*b* can comprise different materials and/or be formed separately from the signal transmission line portion 522*a*.

As illustrated, in one or more embodiments, a first length along the signal transmission line portion 522*a* of a first impedance sub-element portion 542 can be greater than a second length along the signal transmission line of a second impedance sub-element portion 540. That is, a signal transmitted along a signal transmission line can be affected by an impedance caused by the impedance sub-element portion 542 for a longer time period than such signal will be affected by an impedance caused by the impedance sub-element portion 540. Thus, impedances can be differentiated by impedance modification element described herein not only by varying impedance values, but also by varying frequency of impedance time length. In this way, impedances along the signal transmission line 502 can be further differentiated by different signal transmission line and impedance sub-element overlapping sections and signal transmission line and impedance sub-element non-overlapping sections, such as where there can be varied (e.g., different) impedances at different signal transmission line and impedance sub-element overlapping section. That is, both the signal transmission line and impedance sub-element overlapping sections and signal transmission line and impedance sub-element non-overlapping sections can be referred to collectively as differentiated sections of the electronic structure 520, providing differentiated impedances.

An advantage of the aforementioned electronic structure 520 of FIG. 5*b* can be an ability to provide varied impedances, and thus a varied, or even oscillating, frequency response along a transmission line. Such shifting of a frequency response can be desired depending on the usage mode of the transmission line, such as for a low-temperature quantum computing-based application. Another advantage of the electronic structure 520 can be discrete placement of such impedance sub-elements and spacings, which can allow for discrete single-time and/or adjustable control of a varied frequency response to a signal being transmitted along the transmission line.

Figure 6:
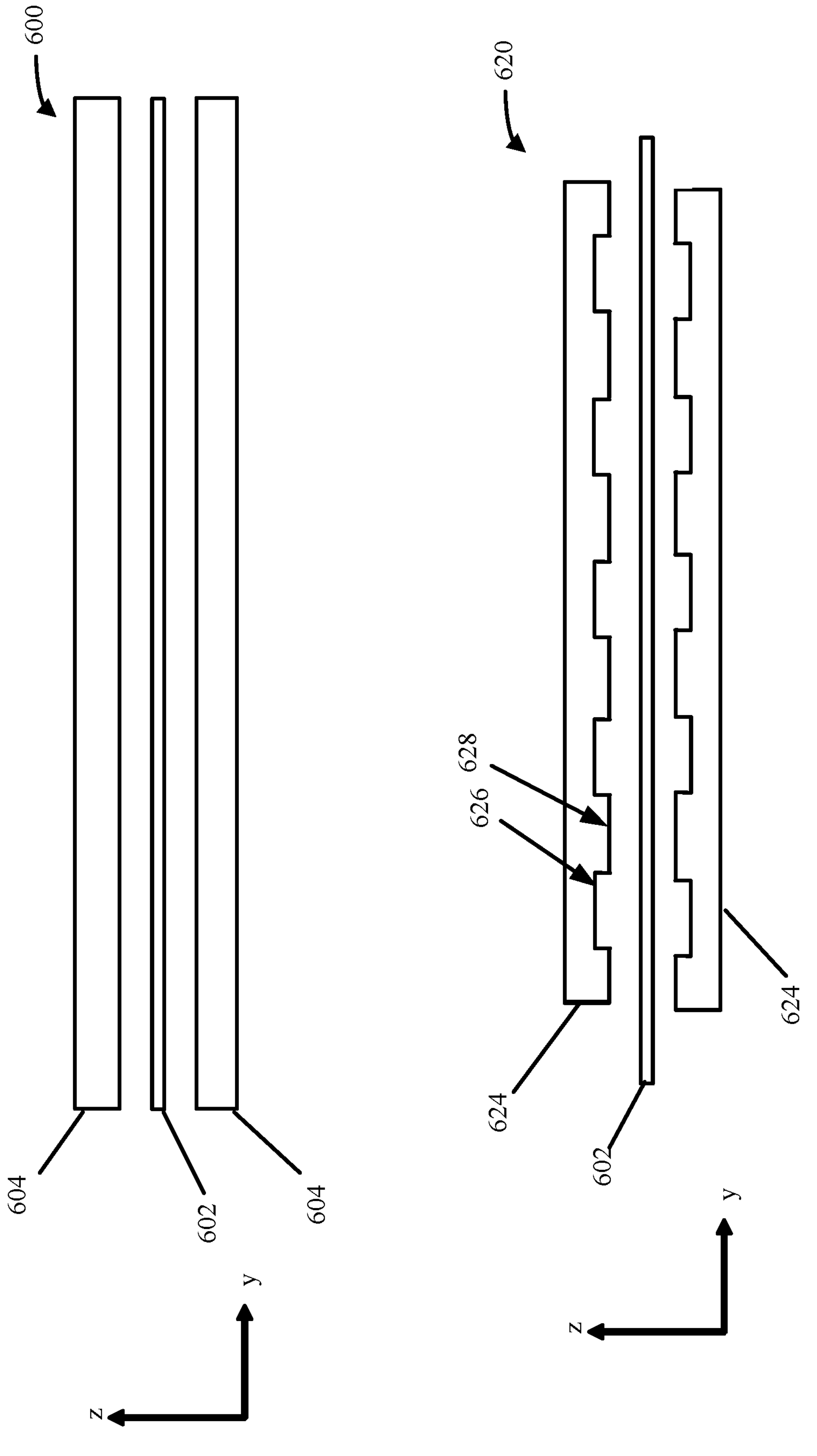
FIG. 6 illustrates a pair of electronic structures, in accordance with one or more embodiments described herein.

Turning next to FIG. 6, an electronic structure 600 can comprise overlapping layers of impedance modification elements 604 and one or more signal transmission lines 602. Repetitive description of like elements and/or processes employed in previously described embodiments is omitted for sake of brevity.

The electronic structure 600 can comprise a pair of impedance modification element plates 604 that can be further modified, such as by a fabrication system (e.g., fabrication system 206). The signal transmission line 602 can be disposed intermediately between the impedance modification element plates 604. In one embodiment, each of the impedance modification element plates 604 can have a greater thickness than a thickness of the signal transmission line 602 in a same direction, such as along the illustrated z-axis (e.g., orthogonal to a long direction of the signal transmission line 602 along which a signal can be transmitted along the y-axis).

In an embodiment, the impedance modification element plates 604 can comprise copper. In an embodiment the impedance modification element plates 604 can be more than each twice as thick as the signal transmission line 602.

The electronic structure 620 can comprise the impedance modification element plates 624 having sections of varying thickness (e.g., along the z-direction). These sections can be alternating sections 626 and 628 of different thicknesses. Sections 628 can be referred to as impedance sub-element sections of the impedance modification element plates 624, with the impedance sub-element sections 628 having greater thickness than the spacing sections 626 disposed between the impedance sub-element sections 628. As used here, "between" can refer to along a direction of a long length of the signal transmission line (e.g., the illustrated y-axis).

In one embodiment, a fabrication system (or more than one fabrication system) can modify the electronic structure 600 into the electronic structure 620. For example, the spacing sections 626 can be formed by etching, laser and/or cutting of the impedance modification element plates 604. In another embodiment, the electronic structure 620 can be formed without first fabricating the electronic structure 600. For example, the impedance sub-element sections 628 can be formed from etching and/or plating onto the impedance modification sub-element plates.

In one or more embodiments, the impedance modification element plates 624 and the signal transmission line 602 can be spaced from one another by spacers, such as made of pre-preg or other material. Pre-preg can be a composite material made from pre-impregnated fibers and a partially cured polymer matrix, such as comprised of epoxy, phenolic resin and/or thermoplastic. The pre-preg material can be selected to lessen and/or prevent movement of the impedance modification element plates 624 relative to one another and/or to the signal transmission line 602 during cooling to low temperatures, such as mK temperatures.

The electronic structure 620 can be a flexible cable, such as being able to be flexed or bent without breaking, fracturing and/or cracking. This can be due to materials and dimensions of the impedance modification element plates 624 and the signal transmission line 602.

In use, the impedance sub-element sections 628 can provide a lower impedance than the spacing sections 626 due to a lesser distance d between an outer periphery of the signal transmission line 602 and a nearest point to the signal transmission line 602 of the impedance sub-element sections 628.

An advantage of the aforementioned electronic structure 620 of FIG. 6 can be an ability to provide varied impedances, and thus a varied, or even oscillating, frequency response along a transmission line. Such shifting of a frequency response can be desired depending on the usage mode of the transmission line, such as for a low-temperature quantum computing-based application. Another advantage of the electronic structure 620 can be discrete placement of such impedance sub-elements and spacings, which can allow for discrete single-time and/or adjustable control of a varied frequency response to a signal being transmitted along the transmission line.

Figure 7:
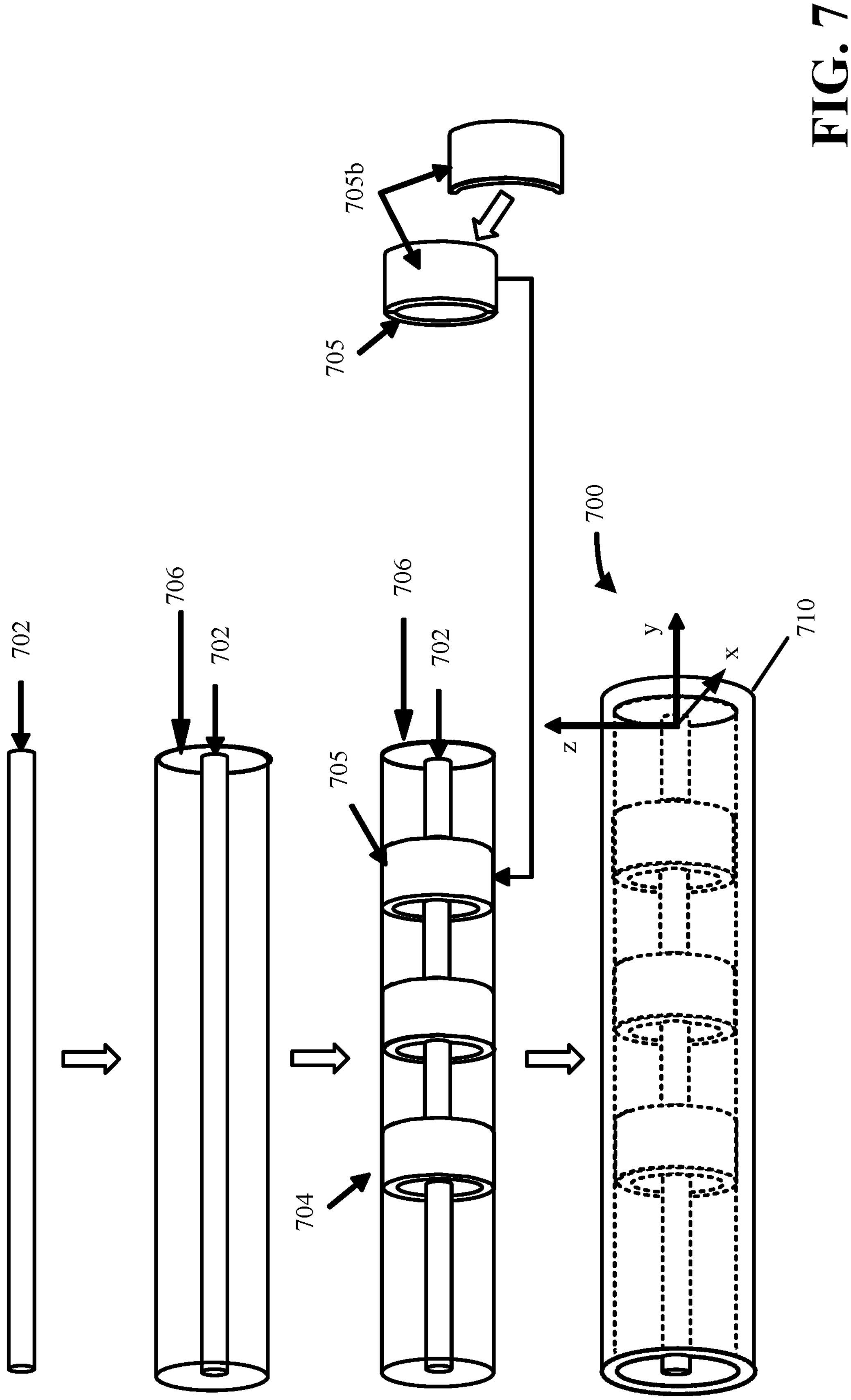
FIG. 7 illustrates another electronic structure, in accordance with one or more embodiments described herein.

At FIG. 7, an electronic structure 700 can comprise a generally cylindrical cable, such as a coaxial cable. In one or more embodiments, the electronic structure 700 can comprise a central conductor material serving as a signal transmission line 702, with a dielectric material section 706 being disposed about the signal transmission line 702, such as surrounding the signal transmission line 702. Repetitive description of like elements and/or processes employed in previously described embodiments is omitted for sake of brevity.

An impedance modification element 704 can comprise a plurality of impedance sub-elements 705 spaced from one another along the signal transmission line 702 (e.g., along the illustrated y-axis being a transmission direction of the signal transmission line 702). The impedance sub-elements 705 can be embedded into and/or can surround the dielectric material section 706.

In one or more embodiments, the impedance sub-elements 705 can comprise metal rings. In one or more embodiments, the impedance sub-elements 705 can comprise dielectric rings being of a different dielectric material than the dielectric material section 706. The impedance sub-element rings can be assembled around the signal transmission line 702 such as by connecting together two-aspects **705*b* of each ring. The aspect 705*b*, such as halves 705*b***, can be semi-circular structures that can connect to one another magnetically, by adhesive, using barbs and/or using clamps on an outer diametrical surface.

In one or more embodiments, the electronic structure 700 can comprise an outer layer being an outer shield 710, such as an outer metal shield 710. As shown, the outer shield 710 is disposed adjacent the impedance sub-elements 705 and spaced farther from the signal transmission line 702 than the impedance sub-elements 705. In one or more embodiments, the impedance sub-elements 705 and/or the outer shield 710 can be adjustably coupled relative to one another or adjustably coupled relative to the signal transmission line 702.

In use, the sections of the electronic structure 700 comprising the impedance sub-elements 705 overlapping the signal transmission line 702 and sections of the electronic structure 700 where the impedance sub-elements 705 do not overlap the signal transmission line 702 can comprise differentiated sections of different impedances. For example, the sections of the electronic structure 700 comprising the impedance sub-elements 705 overlapping the signal transmission line 702 can have lower impedance than the sections of the electronic structure 700 where the impedance sub-elements 705 do not overlap the signal transmission line 702.

An advantage of the aforementioned electronic structure 700 of FIG. 7 can be an ability to provide varied impedances, and thus a varied, or even oscillating, frequency response along a transmission line. Such shifting of a frequency response can be desired depending on the usage mode of the transmission line, such as for a low-temperature quantum computing-based application. Another advantage of the electronic structure 700 can be discrete placement of such impedance sub-elements and spacings, which can allow for discrete single-time and/or adjustable control of a varied frequency response to a signal being transmitted along the transmission line. Indeed, an advantage of the electronic structure 700 can be field-adjustable positioning of the impedance modification element 704 relative to the signal transmission line, thus facilitating field-adjustable impedances of the electronic structure 700.

Figure 8:
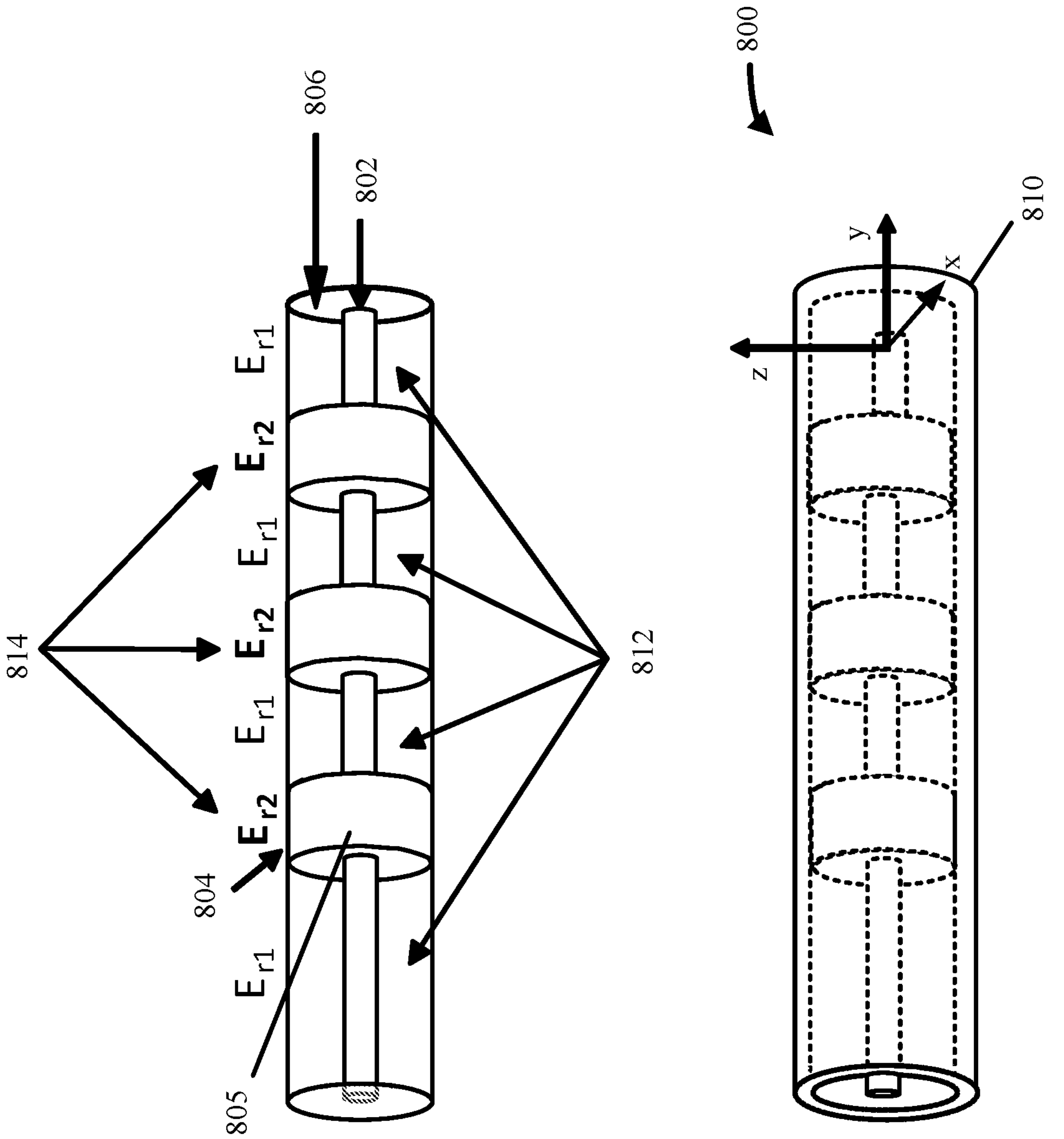
FIG. 8 illustrates yet another electronic structure, in accordance with one or more embodiments described herein.

FIG. 8 illustrates an electronic structure 800 that can comprise a generally cylindrical cable, such as a coaxial cable. In one or more embodiments, the electronic structure 800 can comprise a central conductor material serving as a signal transmission line 802, with a dielectric material section 806 being disposed about the signal transmission line 802, such as surrounding the signal transmission line 802. Repetitive description of like elements and/or processes employed in previously described embodiments is omitted for sake of brevity.

The dielectric material section 806 can comprise sections of different dielectric materials, such as of at least two different dielectric materials being alternated (e.g., stacked) along the signal transmission line 802 (e.g., along the illustrated y-axis being a transmission direction of the signal transmission line 802).

An impedance modification element 804 can comprise a plurality of impedance sub-elements 805 spaced from one another along the signal transmission line 802 (e.g., along the illustrated y-axis being a transmission direction of the signal transmission line 802). The impedance sub-elements 805 can be impedance sub-element sections 814 of a first dielectric material with spacing sections 812 of a second dielectric material being disposed between adjacent ones of the impedance sub-element sections 814. Each of the spacing sections 812 and the impedance sub-element sections 814 can thus comprise metal rings, and more particularly, dielectric rings.

In one or more embodiments, the electronic structure 800 can comprise an outer layer being an outer shield 810, such as an outer metal shield 810. As shown, the outer shield 805 is disposed adjacent the impedance sub-element sections 814 and dielectric spacing sections 812 and is spaced farther from the signal transmission line 802 than the impedance sub-elements 805. In one or more embodiments, the impedance sub-elements 805 and/or the outer shield 810 can be adjustably coupled relative to one another or adjustably coupled relative to the signal transmission line 802.

In use, the sections of the electronic structure 800 comprising the impedance sub-elements 805 overlapping the signal transmission line 802 and sections of the electronic structure 800 where the impedance sub-elements 805 do not overlap the signal transmission line 802 can comprise differentiated sections of different impedances. For example, the sections of the electronic structure 800 comprising the impedance sub-elements 805 overlapping the signal transmission line 802 can have lower impedance than the sections of the electronic structure 800 where the impedance sub-elements 805 do not overlap the signal transmission line 802.

An advantage of the aforementioned electronic structure 800 of FIG. 8 can be an ability to provide varied impedances, and thus a varied, or even oscillating, frequency response along a transmission line. Such shifting of a frequency response can be desired depending on the usage mode of the transmission line, such as for a low-temperature quantum computing-based application. Another advantage of the electronic structure 800 can be discrete placement of such impedance sub-elements and spacings, which can allow for discrete single-time and/or adjustable control of a varied frequency response to a signal being transmitted along the transmission line. Indeed, an advantage of the electronic structure 800 can be field-adjustable positioning of the impedance modification element 804 relative to the signal transmission line, thus facilitating field-adjustable impedances of the electronic structure 800.

Discussion now turns briefly to use of the electronic structure 800 but is applicable to use of any one or more of the electronic structures 200, 220, 300, 400, 500, 520, 600, 620, 700 and/or 800 described herein. Any signal and/or tone, single ended or differential, can be transmitted through a cable. The tones can be considered RF tones, but the concepts described herein also can be applied to transmission of non-RF signals such as transmitted at differential serializer/deserializer (SerDes) lines. For quantum computing, cables can be used for transmitting readout and control tones into a cryogenic unit. Such cables can benefit from use of the electronic structure 800 to provide filtering at the cable.

Figure 9:
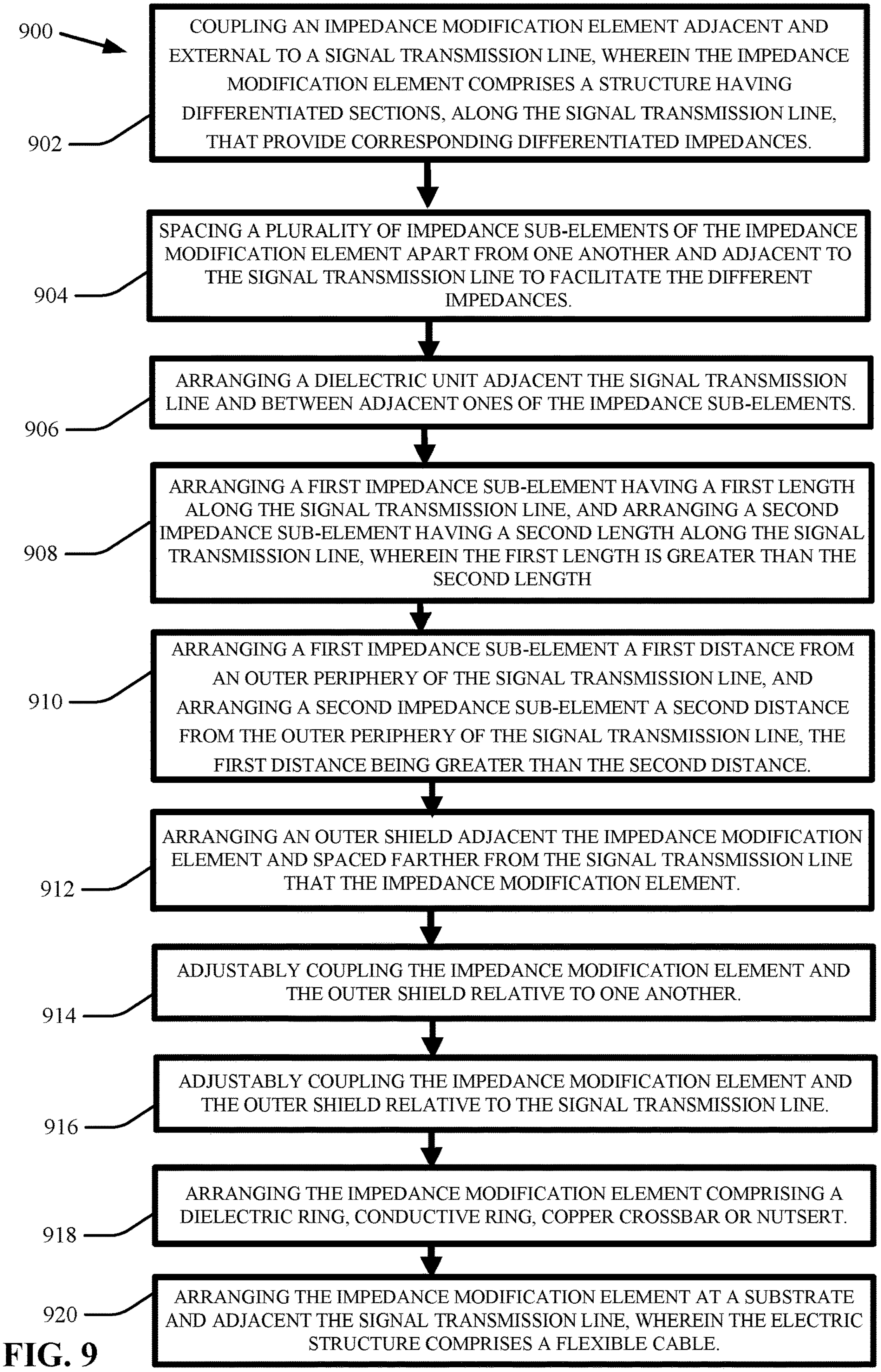
FIG. 9 illustrates a flow diagram of an example method of fabrication of an electronic device, in accordance with one or more embodiments described herein.

Referring next to FIG. 9, illustrated is a flow diagram of an example, non-limiting method 900 that can provide a process to fabricate an electronic structure, such as the electronic structure 700, in accordance with one or more embodiments described herein. While the non-limiting method 900 is described relative to the electronic structure 700 of FIG. 7, the non-limiting method 900 can be applicable also to other systems described herein, such as any of the electronic structures 200, 220, 300, 400, 500, 520, 600, 620, 700 and/or 800. Repetitive description of like elements and/or processes employed in respective embodiments is omitted for sake of brevity.

At 902, the non-limiting method 900 can comprise coupling, by a system operatively coupled to the processor (e.g., fabrication system 206), an impedance modification element adjacent and external to a signal transmission line, wherein the impedance modification element comprises a structure having differentiated sections, along the signal transmission line, which provide corresponding differentiated impedances.

At 904, the non-limiting method 900 can comprise spacing, by the system (e.g., fabrication system 206) a plurality of impedance sub-elements of the impedance modification element apart from one another and adjacent to the signal transmission line to facilitate the different impedances.

At 906, the non-limiting method 900 can comprise arranging, by the system (e.g., fabrication system 206), a dielectric unit adjacent the signal transmission line and between adjacent ones of the impedance sub-elements.

At 908, the non-limiting method 900 can comprise arranging, by the system (e.g., fabrication system 206), a first impedance sub-element having a first length along the signal transmission line, and arranging, by the system (e.g., fabrication system 206) a second impedance sub-element having a second length along the signal transmission line, wherein the first length is greater than the second length At 910, the non-limiting method 900 can comprise arranging, by the system (e.g., fabrication system 206), a first impedance sub-element a first distance from an outer periphery of the signal transmission line, and arranging, by the system (e.g., fabrication system 206) a second impedance sub-element a second distance from the outer periphery of the signal transmission line, wherein the first distance is greater than the second distance.

At 912, the non-limiting method 900 can comprise arranging, by the system (e.g., fabrication system 206), an outer shield adjacent the impedance modification element and spaced farther from the signal transmission line that the impedance modification element.

At 914, the non-limiting method 900 can comprise adjustably coupling, by the system (e.g., fabrication system 206), the impedance modification element and the outer shield relative to one another.

At 916, the non-limiting method 900 can comprise adjustably coupling, by the system (e.g., fabrication system 206), the impedance modification element and the outer shield relative to the signal transmission line.

At 918, the non-limiting method 900 can comprise arranging, by the system (e.g., fabrication system 206), the impedance modification element comprising a dielectric ring, conductive ring, copper crossbar or nutsert.

At 920, the non-limiting method 900 can comprise arranging, by the system (e.g., fabrication system 206), the impedance modification element at a substrate and adjacent the signal transmission line, wherein the electric structure comprises a flexible cable.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more devices and/or methods provided herein relate to a method for fabricating a filtering electronic device having a co-integrated impedance modification element and signal transmission line. An electronic structure can comprise a signal transmission line, and an impedance modification element adjacent to and external to the signal transmission line, wherein the impedance modification element comprises a structure having differentiated sections, along the signal transmission line, that provide corresponding differentiated impedances. In an embodiment, the impedance modification element can comprise a plurality of impedance sub-elements spaced apart from one another along and adjacent to the signal transmission line to facilitate the different impedances.

An electronic structure can comprise a signal transmission line; and an impedance modification element adjacent to and external to the signal transmission line, wherein the impedance modification element comprises a structure having differentiated sections, along the signal transmission line, that provide corresponding differentiated impedances.

The electronic structure can optionally further comprise wherein the impedance modification element comprises a plurality of impedance sub-elements spaced apart from one another along and adjacent to the signal transmission line to facilitate the different impedances.

Relative to the electronic structure of any one or more of the above paragraphs, the equal spacing can applied between adjacent ones of the impedance sub-elements.

Relative to the electronic structure of any one or more of the above paragraphs, a dielectric unit can be disposed adjacent the signal transmission line and between adjacent ones of the impedance sub-elements.

Relative to the electronic structure of any one or more of the above paragraphs, a first spacing between an outer periphery of the signal transmission line and a first impedance sub-element of the plurality of impedance sub-elements can be greater than a second spacing between the outer periphery of the signal transmission line and a second impedance sub-element of the plurality of impedance sub-elements.

Relative to the electronic structure of any one or more of the above paragraphs, a first impedance sub-element has a first length along the signal transmission line that can be greater than a second length of a second impedance sub-element along the signal transmission line, and the first impedance sub-element and the second impedance sub-element can be disposed adjacent to but spaced apart from one another along the signal transmission line.

Relative to the electronic structure of any one or more of the above paragraphs, the impedance modification element can surround the signal transmission line, and the signal transmission line can comprise a coaxial cable or a flex cable.

Relative to the electronic structure of any one or more of the above paragraphs, the impedance modification element can comprise an outer shield adjacent the signal transmission line and an impedance sub-element aligned between the signal transmission line and the outer shield.

Relative to the electronic structure of any one or more of the above paragraphs, the impedance modification element can comprise an outer shield member and a plurality of impedance sub-elements disposed between the signal transmission line and the outer shield, the plurality of impedance sub-elements can be spaced from one another along the signal transmission line, and sections of the impedance modification element at spaces between the impedance sub-elements can provide lower impedance sections of the impedance modification element along the signal transmission line.

A method for fabricating an electronic structure by a fabrication system can comprise coupling, by the fabrication system, an impedance modification element adjacent and external to a signal transmission line, wherein the impedance modification element comprises a structure having differentiated sections, along the signal transmission line, that provide corresponding differentiated impedances.

The method can optionally comprise spacing, by the fabrication system, a plurality of impedance sub-elements of the impedance modification element apart from one another and adjacent to the signal transmission line to facilitate the different impedances.

The method of any one or more of the above paragraphs can further comprise applying, by the fabrication system, equal spacing between adjacent ones of the impedance sub-elements.

The method of any one or more of the above paragraphs can further comprise arranging, by the fabrication system, a dielectric unit adjacent the signal transmission line and between adjacent ones of the impedance sub-elements.

Relative to the method of any one or more of the above paragraphs, a first impedance sub-element can have a first length along the signal transmission line that is greater than a second length of a second impedance sub-element along the signal transmission line, and the first impedance sub-element and the second impedance sub-element can be disposed adjacent to but spaced apart from one another along the signal transmission line.

Another electronic structure can comprise a signal transmission line, and an impedance modification element adjacent the signal transmission line, the impedance modification element comprising a plurality of impedance sub-elements spaced apart from one another, along the signal transmission line, that provide corresponding differentiated impedances, and an outer shield adjacent the impedance sub-elements and spaced farther from the signal transmission line than the impedance sub-elements.

Optionally, relative to the other electronic structure, the impedance sub-elements and outer shield can be adjustably coupled relative to one another or are adjustably coupled relative to the signal transmission line.

Relative to the electronic structure of any one or more of the above paragraphs, the impedance modification element further can comprise a non-fully continuous ground plane.

Relative to the electronic structure of any one or more of the above paragraphs, the impedance modification element further can comprise a dielectric ring disposed about the signal transmission line.

Relative to the electronic structure of any one or more of the above paragraphs, the impedance modification element further can comprise a conductive ring disposed about the signal transmission line.

Relative to the electronic structure of any one or more of the above paragraphs, the impedance modification element further can comprise a copper crossbar.

An advantage of the aforementioned devices and/or methods can be an ability to provide varied impedances, and thus a varied, or even oscillating, frequency response along a transmission line. Such shifting of a frequency response can be desired depending on the usage mode of the transmission line, such as for a low-temperature quantum computing-based application. Another advantage of the electronic structure can be discrete placement of such impedance sub-elements and spacings, which can allow for discrete single-time and/or adjustable control of a varied frequency response to a signal being transmitted along the transmission line. Still another advantage of the electronic structure can be shielding, by an outer shield, of the sub-elements from external temperatures and/or noise that can affect the varied frequency response.

Another advantage of the aforementioned devices and/or methods can be integration of a filtering element (e.g., impedance modification element) with a transmission line, thus lower component count, lowering overall manufacturing cost and/or increasing component density (e.g., saving space and/or real estate). In one or more embodiments, the impedance modification element can comprise a plurality of impedance sub-elements spaced apart from one another along and adjacent to the signal transmission line to facilitate the different impedances.

In one or more embodiments, the impedance sub-elements and outer shield can be adjustably coupled relative to one another or can be adjustably coupled relative to the signal transmission line. An advantage of this feature can be allowance for field-adjusting of filtering to adjust filtering relative to a usage of the electronic structure, such as due to different quantum executions with respect to use at a quantum system.

Indeed, in view of the one or more embodiments described herein, a practical application of the systems, computer-implemented methods and/or computer program products described herein can be ability to employ a filtering scheme integrated with a signal transmission line, which filtering scheme can be adjusted post-manufacturing. As a result, a signal transmitted along the signal transmission line can be modified, such as in a different manner relative to various different usages of the signal transmission line. This is a useful and practical application of computers, thus providing enhanced (e.g., improved and/or optimized) operation of the hardware and/or software components of a target system (e.g., quantum system) by allowing for adjustment corresponding to use of the signal transmission line and filtering scheme, such as to adjust for system noise, signal noise and/or an environmental condition. Overall, such tools can constitute a concrete and tangible technical improvement in the fields of signal transmission and signal filtering.

Furthermore, one or more embodiments described herein can be employed in a real-world system based on the disclosed teachings. For example, one or more electronic structure embodiments described herein can function with a quantum system that can receive as input a quantum job request and can measure a real-world qubit state of one or more qubits, such as superconducting qubits, of the quantum system, by executing the translated quantum source code at some level of the quantum system. The quantum system can employ one or more electronic structure embodiments described herein to filter one or more signals transmitted along one or more signal transmission lines.

Moreover, a device and/or method described herein can be implemented in one or more domains to enable scaled filtering. Indeed, use of an electronic structure as described herein can be scalable, such as where plural electronic structures can be used at a single system (e.g., quantum system, radio system, waveform system and/or signal transmission system) at least partially at a same time as one another.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

Turning next to FIG. 10, a detailed description is provided of additional context for the one or more embodiments described herein at FIGS. 1-9.

FIG. 10 and the following discussion are intended to provide a brief, general description of a suitable computing environment 1000 in which one or more embodiments described herein at FIGS. 1-9 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as translation of an original source code based on a configuration of a target system by the quantum circuit execution code 2000. In addition to block 2000, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 2000, as identified above), peripheral device set 1014 (including user interface (UI), device set 1023, storage 1024, and Internet of Things (IOT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 2000 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid-state storage devices. Operating system 1022 may take several forms, such as various known proprietary operating systems or open-source Portable Operating System Interface type operating systems that employ a kernel. The code included in block 2000 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001) and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. An electronic structure comprising:

a signal transmission line;

an impedance modification element adjacent to and external to the signal transmission line, wherein the impedance modification element comprises a structure having differentiated sections, along the signal transmission line, that provide corresponding differentiated impedances, wherein the impedance modification element comprises a plurality of impedance sub-elements spaced apart from one another along or adjacent the signal transmission line, wherein a first spacing between an outer periphery of the signal transmission line and a first impedance sub-element of the plurality of impedance sub-elements is greater than a second spacing between the outer periphery of the signal transmission line and a second impedance sub-element of the plurality of impedance sub-elements, or wherein a first spacing between an outer periphery of the signal transmission line and a first impedance sub-element of the plurality of impedance sub-elements is greater than a second spacing between the outer periphery of the signal transmission line and a second impedance sub-element of the plurality of impedance sub-elements; and a substrate, wherein the signal transmission line is disposed between the substrate and the impedance modification element.

2. The electronic structure of claim 1, wherein equal spacing is applied between adjacent ones of the impedance sub-elements.

3. The electronic structure of claim 1, wherein a dielectric unit is disposed adjacent the signal transmission line and between adjacent ones of the impedance sub-elements.

4. The electronic structure of claim 1, wherein the impedance modification element surrounds the signal transmission line, and wherein the signal transmission line comprises a coaxial cable or a flex cable.

5. The electronic structure of claim 1, wherein the impedance modification element comprises an outer shield adjacent the signal transmission line and an impedance sub-element aligned between the signal transmission line and the outer shield.

6. The electronic structure of claim 1, wherein the impedance modification element comprises an outer shield member and a plurality of impedance sub-elements disposed between the signal transmission line and the outer shield, wherein the plurality of impedance sub-elements are spaced from one another along the signal transmission line, and wherein sections of the impedance modification element at spaces between the impedance sub-elements provide lower impedance sections of the impedance modification element along the signal transmission line.

7. A method for fabricating an electronic structure by a fabrication system, the method comprising:

coupling, by the fabrication system, an impedance modification element adjacent and external to a signal transmission line, wherein the impedance modification element comprises a structure having differentiated sections, along the signal transmission line, that provide corresponding differentiated impedances, and wherein the signal transmission line is coupled between a substrate and the impedance modification element, wherein a first impedance sub-element has a first length along the signal transmission line that is greater than a second length of a second impedance sub-element along the signal transmission line, and wherein the first impedance sub-element and the second impedance sub-element are disposed adjacent to but spaced apart from one another along or adjacent the signal transmission line.

8. The method according to claim 7, further comprising:

spacing, by the fabrication system, a plurality of impedance sub-elements of the impedance modification element apart from one another and adjacent to the signal transmission line to facilitate the different impedances.

9. The method according to claim 8, further comprising:

applying, by the fabrication system, equal spacing between adjacent ones of the impedance sub-elements.

10. The method according to claim 8, further comprising:

arranging, by the fabrication system, a dielectric unit adjacent the signal transmission line and between adjacent ones of the impedance sub-elements.

11. An electronic structure comprising:

a signal transmission line;

an impedance modification element adjacent the signal transmission line, the impedance modification element comprising a plurality of impedance sub-elements spaced apart from one another, along the signal transmission line, that provide corresponding differentiated impedances, and an outer shield adjacent the impedance sub-elements and spaced farther from the signal transmission line than the impedance sub-elements; and a substrate, wherein the signal transmission line is disposed between the substrate and the impedance modification element, and wherein the impedance sub-elements and the outer shield are adjustably coupled relative to one another or are adjustably coupled relative to the signal transmission line.

12. The electronic structure of claim 11, wherein the impedance modification element further comprises a non-fully continuous ground plane.

13. The electronic structure of claim 11, wherein the impedance modification element further comprises a dielectric ring disposed about the signal transmission line.

14. The electronic structure of claim 11, wherein the impedance modification element further comprises a conductive ring disposed about the signal transmission line.

15. The electronic structure of claim 11, wherein the impedance modification element further comprises a copper crossbar.

* * * * *